United States Patent
Takashima et al.

(10) Patent No.: US 9,403,990 B2
(45) Date of Patent: Aug. 2, 2016

(54) CURING-TYPE COATING-AGENT COMPOSITION

(75) Inventors: Hiroaki Takashima, Kariya (JP); Kyoko Kumagai, Kariya (JP); Hidetaka Hayashi, Kariya (JP); Tetsuya Mitsuoka, Kariya (JP); Naoharu Ueda, Kariya (JP); Hisashi Muramatsu, Kariya (JP); Kazumasa Inata, Nagoya (JP); Takeshi Fujita, Nagoya (JP); Yasuyuki Sanai, Nagoya (JP); Eiichi Okazaki, Nagoya (JP); Satoshi Yoneda, Nagoya (JP); Naomasa Furuta, Nagoya (JP)

(73) Assignees: KABUSHIKI KAISHA TOYOTA JIDOSHOKKI, Aichi (JP); TOAGOSEI CO., LTD., Tokyo (JP)

( * ) Notice: Subject to any disclaimer, the term of this patent is extended or adjusted under 35 U.S.C. 154(b) by 0 days.

(21) Appl. No.: 14/343,323

(22) PCT Filed: Aug. 27, 2012

(86) PCT No.: PCT/JP2012/005356
§ 371 (c)(1),
(2), (4) Date: Mar. 6, 2014

(87) PCT Pub. No.: WO2013/035265
PCT Pub. Date: Mar. 14, 2013

(65) Prior Publication Data
US 2014/0228468 A1 Aug. 14, 2014

(30) Foreign Application Priority Data

Sep. 6, 2011 (JP) ................................ 2011-194296
Sep. 6, 2011 (JP) ................................ 2011-194302

(51) Int. Cl.
C09D 4/00 (2006.01)
C09D 7/12 (2006.01)
C08G 18/67 (2006.01)
C08G 18/79 (2006.01)
C08F 290/06 (2006.01)
C09D 175/16 (2006.01)
C08K 9/06 (2006.01)

(52) U.S. Cl.
CPC .............. *C09D 4/00* (2013.01); *C08F 290/067* (2013.01); *C08G 18/672* (2013.01); *C08G 18/673* (2013.01); *C08G 18/792* (2013.01); *C09D 7/1233* (2013.01); *C09D 175/16* (2013.01); *C08K 9/06* (2013.01)

(58) Field of Classification Search
CPC .. C08F 290/067; C08F 18/672; C08F 18/673; C08F 18/792; C09D 175/16; C09D 4/00; C09D 7/1233; C08K 9/06
USPC ..................... 526/261; 522/63, 167
See application file for complete search history.

(56) References Cited

FOREIGN PATENT DOCUMENTS

| EP | 0869154 | * | 10/1998 | ............... C09D 4/02 |
|----|---------|---|---------|--------------------------|
| EP | 0869154 | A1 | 10/1998 | |
| EP | 2371871 | A1 | 10/2011 | |
| JP | 2000-063701 | A | 2/2000 | |
| JP | 2001-214122 | A | 8/2001 | |
| JP | 3747065 | B2 | 2/2006 | |
| JP | 2010-254840 | A | 11/2010 | |
| JP | 2011088054 | A | 5/2011 | |
| JP | 2011256344 | A | 12/2011 | |
| WO | 97/11129 | A1 | 3/1997 | |
| WO | 2009/054508 | A1 | 4/2009 | |
| WO | 2010067876 | A1 | 6/2010 | |
| WO | 2011/048775 | A1 | 4/2011 | |
| WO | 2011/048776 | A1 | 4/2011 | |

OTHER PUBLICATIONS

Communication dated Oct. 21, 2014, issued by the German Patent Office in counterpart Application No. 112012003704.9.
Communication dated Oct. 21, 2014, issued by the German Patent Office in counterpart Application No. 112012003707.3.
Communication dated Oct. 21, 2014, issued by the German Patent Office in counterpart Application No. 112012003705.7.
International Search Report for PCT/JP2012/005356 dated Nov. 13, 2012.
Communication dated Jul. 1, 2015, issued by the U.S. Patent and Trademark Office in corresponding U.S. Appl. No. 14/343,332.
Communication dated Jul. 8, 2015, issued by the U.S. Patent and Trademark Office in corresponding U.S. Appl. No. 14/343,336.

* cited by examiner

Primary Examiner — Ling Choi
Assistant Examiner — Chun-Cheng Wang
(74) Attorney, Agent, or Firm — Sughrue Mion, PLLC

(57) ABSTRACT

A curing-type coating-agent composition according to the present invention contains: Component (A) (e.g., an isocyanuric ring-containing urethane (meth)acrylate compound) in an amount of from 20 to 80 parts by mass; Component (B) (e.g., an isocyanuric ring-containing tri(meth)acrylate compound free from any urethane bond) in an amount of from 10 to 70 parts by mass; Component (C-1) (e.g., a reaction compound between a colloidal silica and an alkoxysilane compound having a maleimide group) in amount of from 1 to 35 parts by mass, or Component (C-2) (e.g., a specific organosilicon compound) in an amount of from 5 to 35 parts by mass; a radical-polymerization initiator serving as Component (D) in an amount of from 0.1 to 10 parts by mass; an ultraviolet absorber serving as Component (E) in an amount of from 1 to 12 parts by mass; and an organic solvent serving as Component (F) in an amount of from 10 to 1,000 parts by mass; with respect to a sum of the Component (A), the Component (B), and the Component (C-1) or the Component (C-2) being taken as 100 parts by mass. The aforementioned composition demonstrates excellent wear resistance and weatherability as a coating agent for plastic substrate, or the like, which is employed outside.

9 Claims, No Drawings

CURING-TYPE COATING-AGENT COMPOSITION

CROSS REFERENCE TO RELATED APPLICATIONS

This application is a National Stage of International Application No. PCT/JP2012/005356 filed Aug. 27, 2012, claiming priority based on Japanese Patent Application No. 2011-194296, filed Sep. 6, 2011 and Japanese Patent Application No. 2011-194302, filed Sep. 6, 2011, the contents of all of which are incorporated herein by reference in their entirety.

TECHNICAL FIELD

The present invention relates to a curing-type coating-agent composition, which is excellent in terms of post-curing wear resistance and weatherability, and which can be applied preferably as protective films for substrates being employed outside, in particular, for substrates being made of resins.

BACKGROUND ART

Resinous materials, among them, transparent resinous materials, which are represented by polycarbonate or the like, have been utilized widely in various applications while taking advantages of such characteristics as being low specific gravity as well as lightweight, being processed easily, and being strong against shocks compared with inorganic glass. On the contrary, resinous materials have the following disadvantages: their surface is likely to be damaged so that the gloss or transparency is likely to be lost; they are likely to be damaged by organic solvents; or moreover, they are poor in the weatherability (e.g., the photo stability against ultraviolet rays, etc.) and heat resistance; and the like. Consequently, it is often the case that resinous materials are used while being covered with various protective films in order to improve their superficial characteristics.

As such a protective film, a hard coating layer is given which is made by curing a light curing-type coating-agent composition, for instance.

For resinous materials being employed outside, good weatherability is also required along with wear resistance. As a light curing-type coating-agent composition being provided with both wear resistance and weatherability combinedly, a composition for forming wear-resistant coating has been known (see Patent Literature No. 1). The composition comprises colloidal silica fine particles, a monomer mixture, and a photo-polymerization initiator in a specific proportion, respectively. The colloidal silica fine particles include a silane compound having a methacryloyloxy group, an acryloyloxy group or a vinyl group that is modified superficially in a predetermined weight proportion. The monomer mixture includes a poly[(meth)acryloyloxyalkyl]isocyanurate, and a urethane poly(meth)acrylate, which has an alicyclic framework.

Moreover, another coating-agent composition has also been known (see Patent Literature No. 2). The coating-agent composition includes the following in a specific proportion, respectively: a poly(meth)acrylate of mono- or poly-pentaerythritol; a urethane poly(meth)acrylate, which has at least two radically-polymerizable unsaturated double bonds; a poly[(meth)acryloyloxyalkyl](iso)cyanurate; an ultraviolet absorber; a hindered amine-based light stabilizer; and a photo-polymerization initiator.

An example is also available in which a thermal curing-type coating-agent composition is used. Patent Literature No. 3 discloses a plastic article. In the plastic article, a first layer, which is made by curing a thermo-curing undercoating-agent composition being good in the weatherability, is disposed on a surface of a resinous substrate; and a second layer, which is made by curing a thermo-curing coating-agent composition being good in the wear resistance, is disposed on the first layer.

RELATED TECHNICAL LITERATURE

Patent Literature

Patent Literature No. 1: Japanese Patent Gazette No. 3747065;
Patent Literature No. 2: Japanese Unexamined Patent Publication (KOKAI) Gazette No. 2000-063701;
Patent Literature No. 3: Japanese Unexamined Patent Publication (KOKAI) Gazette No. 2001-214122; and
Patent Literature No. 4: Japanese Unexamined Patent Publication (KOKAI) Gazette No. 2010-254840

SUMMARY OF THE INVENTION

Assignment to be Solved by the Invention

In the plastic article being set forth in Patent Literature No. 3, the wear resistance, and the weatherability are made compatible with each other at higher level. However, thermal curing-type compositions have the following problems: they require a large amount of energy in order to form cured films, compared with photo curing-type compositions; and they are poor in terms of efficiency, because longer times are needed to heat them; and the like. Moreover, they are not desirable from the viewpoint of productivity, because the number of processing steps increases when not only a coating-agent composition but also an undercoating-agent composition are employed as done in Patent Literature No. 3. Hence, a coating-agent composition, which makes it possible to form protective films that demonstrate wear resistance and weatherability sufficiently without using any undercoating-agent composition, has been desired eagerly.

Using a photo curing-type composition makes production with good efficiency feasible. Although the above-mentioned urethane poly(meth)acrylate having an alicyclic framework is a component that improves the weatherability of hard coating layer, it is insufficient with regard to the wear resistance. In the respective examples according to Patent Literature No. 1, colloidal silica particles (or ultraviolet-curing silicone), which are modified superficially with a silane compound having a methacryloyloxy group, are employed along with this urethane poly(meth)acrylate. However, the resulting wear resistance cannot be said to be sufficient, and moreover it is unclear with regard to the weatherability after 2,000 hours or later.

On the other hand, a hard coating layer, which is made by curing the above-mentioned poly(meth)acrylate of mono- or poly-pentaerythritol, exhibits a high hardness. Hence, in Patent Literature No. 2, this component is used in combination with a urethane poly(meth)acrylate having at least two radically-polymerizable unsaturated double bonds, namely, a component that upgrades weatherability. However, as a result of investigations done by the present inventors, it was understood that it is not possible to withstand accelerated tests for much longer periods of time by simply using a component for upgrading wear resistance in combination with another component for upgrading weatherability.

Moreover, like the one as set forth in Patent Literature No. 4, an activated energy-ray curing-type composition including a radically-polymerizable compound has also been developed recently. This composition contains the following in a specific ratio: a specific urethane (meth)acrylate compound containing an isocyanurate framework; an acrylate compound having an isocyanurate framework; and radically-polymerizable inorganic fine particles. However, as a result of investigations done by the present inventors, it was understood that the composition was poor in terms of adhesiveness after long-time accelerated test.

In other words, even when a hard coating layer is formed on a surface of a resinous substrate with use of the above-mentioned photo curing-type coating-agent composition, it is difficult to make the resulting wear resistance and weatherability compatible with each other at higher level.

In view of these problematic issues, the present invention aims at providing a curing-type coating-agent composition, which demonstrates excellent wear resistance and weatherability as a coating agent for substrate being employed outside, in particular, for substrate being made of resin.

Means for Solving the Assignment

As a result of the present inventors' earnest investigations, they found out that a composition is excellent in terms of post-curing transparency, wear resistance, and weatherability, composition in which the following are used combinedly in a specific proportion, respectively: an isocyanuric-ring containing urethane (meth)acrylate compound; an isocyanuric-ring containing tri(meth)acrylate compound being free from any urethane bond; and a reaction product between a colloidal silica and an alkokysilane compound having a maleimide group, or a specific organosilicon compound; and additionally to which additives are added in an appropriate amount, respectively. Thus, they arrived at completing the present invention.

Specifically, a curing-type coating-agent composition according to the present invention is characterized in that the curing-type coating-agent composition contains:

following Component (A) in an amount of from 20 to 80 parts by mass;

following Component (B) in an amount of from 10 to 70 parts by mass;

following Component (C-1) in an amount of from 1 to 35 parts by mass, or following Component (C-2) in an amount of from 5 to 35 parts by mass;

a radical-polymerization initiator serving as Component (D) in an amount of from 0.1 to 10 parts by mass;

an ultraviolet absorber serving as Component (E) in an amount of from 1 to 12 parts by mass; and an organic solvent serving as Component (F) in an amount of from 10 to 1,000 parts by mass;

with respect to a sum of the Component (A), the Component (B) and the Component (C-1) or the Component (C-2) being taken as 100 parts by mass.

Component (A):

an isocyanuric ring-containing urethane (meth)acrylate compound being expressed by following (Chemical Formula 1)

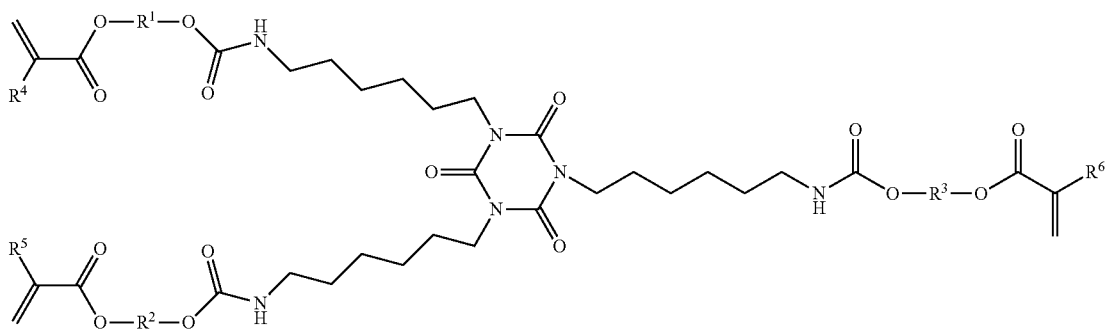

(1)

(In General Formula (1), each of $R^1$, $R^2$ and $R^3$ expresses a divalent organic group whose number of carbon atoms is from 2 to 10 independently; and each of $R^4$, $R^5$ and $R^6$ expresses a hydrogen atom, or a methyl group independently.);

Component (B):

an isocyanuric ring-containing tri(meth)acrylate compound being free from any urethane bond that is expressed by following General Formula (2);

(Chemical Formula 2)

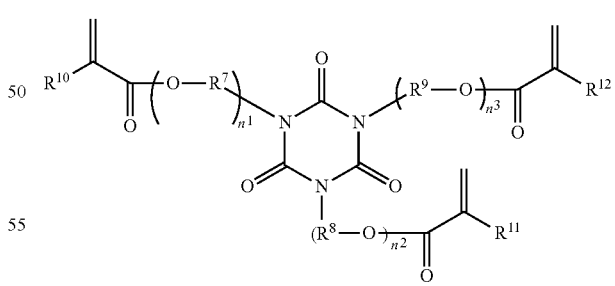

(2)

(In General Formula (2), each of $R^7$, $R^8$ and $R^9$ expresses a divalent organic group whose number of carbon atoms is from 2 to 10 independently; each of $R^{10}$, $R^{11}$ and $R^{12}$ expresses a hydrogen atom, or a methyl group independently; each of $n^1$, $n^2$ and $n^3$ expresses a number of from 1 to 3 independently; and $n^1+n^2+n^3$=from 3 to 9.);

Component (C-1):

an involatile component in reaction products being made by reacting an alkoxysilane compound (c1), which is expressed by following General Formula (3), with a colloidal silica (c2), in a mass ratio of from 9:1 to 1:9 between (c1) and (c2), the involatile component involving those in which (c2) is modified chemically with (c1);

(Chemical Formula 3)

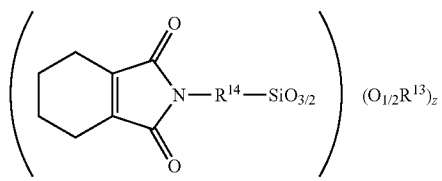

(3)

(In General Formula (3), $R^{13}$ expresses a hydrogen atom, or a monovalent organic group; $R^{14}$ expresses a divalent hydrocarbon whose number of carbon atoms is from 1 to 6; and "z" expresses a positive number of from 0.1 or more to 3 or less; moreover, when "z" is less than 3, the alkoxysilane compound (c1) involves a condensate, and $R^{13}$ within a molecule in the condensate may even involve two or more types of distinct groups.);

Component (C-2):

an organosilicon compound being obtainable by subjecting a silicon compound (c3) being expressed by following General Formula (4) and another silicon compound (c4) being expressed by following General Formula (5) to hydrolytic copolycondensation in a proportion of from 0.3 to 1.8 mol of the compound (c4) with respect to 1 mol of the compound (c3);

(Chemical Formula 4)

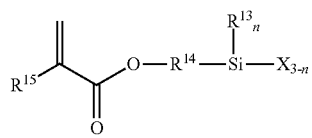

(4)

(In General Formula (4), $R^{13}$ is an organic group having an alkyl group whose number of carbon atoms is from 1 to 6, an aralkyl group whose number of carbon atoms is from 7 to 10, or an aryl group whose number of carbon atoms is from 6 to 10; $R^{14}$ is a divalent saturated hydrocarbon group whose number of carbon atoms is from 1 to 6; $R^{15}$ is a hydrogen atom, or a methyl group; "X" is a hydrolyzable group; "X"s can be identical with each other, or can be distinct from one other; and "n" is 0 or 1.);

$$SiY_4 \quad (5)$$

(In General Formula (5), "Y" is a siloxane-bond generation group; and "Y"s may be identical with each other, or may be distinct from one other.)

It is preferable to employ the composition according to the present invention as a light curing-type coating-agent composition, which is cured by irradiating it with light, by employing a photo radical-polymerization initiator serving as Component (D). By means of curing the composition by irradiating it with light, it becomes feasible to cure it with lower energy in a shorter period of time. Moreover, by specifying a blending proportion of the ultraviolet absorber and furthermore a type of the ultraviolet absorber, the curing progresses satisfactorily even when curing the composition by irradiating it with light. Thus, cured films are obtainable which are excellent in terms of transparency, and in which the wear resistance and weatherability are made compatible with each other.

Effect of the Invention

The curing-type coating-agent composition according to the present invention demonstrates excellent wear resistance and weatherability as a coating agent for substrate being employed outside, in particular, for substrate being made of resin.

MODES FOR CARRYING OUT THE INVENTION

Hereinafter, explanations will be made on some of the best modes for performing the curing-type coating-agent composition according to the present invention. Note that, unless otherwise specified, ranges of numeric values, "from 'p' to 'q'" being set forth in the present description, involve the lower limit, "p," and the upper limit, "q," in those ranges. And, the other ranges of numeric values are composable by arbitrarily combining values that involve not only those upper-limit values and lower-limit values but also numerical values that are enumerated in the following examples.

A curing-type coating-agent composition according to the present invention contains: Component (A) in an amount of from 20 to 80 parts by mass; Component (B) in an amount of from 10 to 70 parts by mass; Component (C-1) in an amount of from 1 to 35 parts by mass, or Component (C-2) in an amount of from 5 to 35 parts by mass; a radical-polymerization initiator serving as Component (D) in an amount of from 0.1 to 10 parts by mass; an ultraviolet absorber serving as Component (E) in an amount of from 1 to 12 parts by mass; and an organic solvent serving as Component (F) in an amount of from 10 to 1,000 parts by mass; with respect to a sum of following Component (A), following Component (B) and following Component (C-1) or following Component (C-2) being taken as 100 parts by mass. Hereinafter, explanations will be made on details of the composition and its respective components.

Note that, in the present description, an acryloyl group or a methacryloyl group is expressed as a "(meth)acryloyl group." Moreover, acrylate or methacrylate is expressed as "(meth) acrylate."

Component (A)

Component (A) is an isocyanuric ring-containing urethane (meth)acrylate compound being expressed by following General Formula (1).

(Chemical Formula 5)

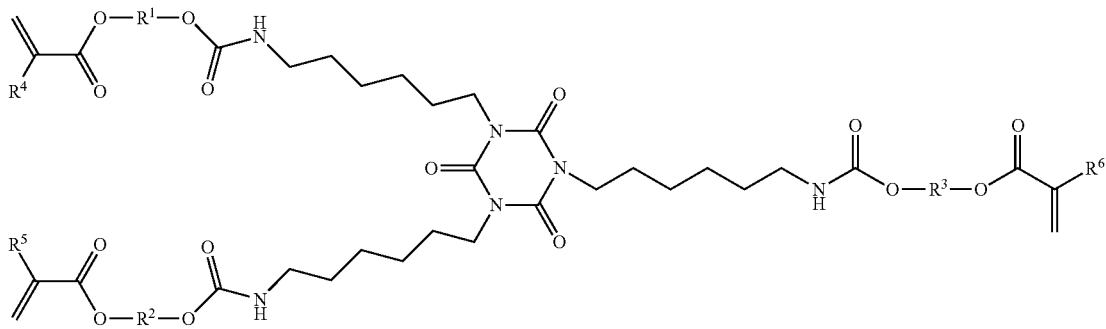

(1)

In General Formula (1), each of $R^1$, $R^2$ and $R^3$ expresses a divalent organic group whose number of carbon atoms is from 2 to 10 independently. As for a divalent organic group whose number of carbon atoms is from 2 to 10, an alkylene group, such as an ethylene group, a trimethylene group, a propylene group or a tetramethylene group, whose number of carbon atoms is from 2 to 4 is preferable. Moreover, compounds are also involved, compounds in which the compounds according to General Formula (1) that have one of these groups have been modified with ε-caprolactone. In this case, the divalent organic group whose number of carbon atoms is from 2 to 10 involves —$OCOCH_2CH_2CH_2CH_2CH_2$—. Of these, those in which all of $R^1$, $R^2$ and $R^3$ can respectively be a tetramethylene group are especially preferable, because post-curing compositions (or cured films) turn into ones that are excellent in terms of wear resistance and weatherability especially.

In General Formula (1), each of $R^4$, $R^5$ and $R^6$ expresses a hydrogen atom, or a methyl group independently. Compounds, in which all of $R^4$, $R^5$ and $R^6$ can respectively be a hydrogen atom, are especially preferable, from the viewpoint that the resulting compositions turn into ones that are excellent in terms of curability.

Compound (A) can be synthesized by means of addition reaction between a nurate-type trimer of hexamethylene diisocyanate and hydroxyalkyl (meth)acrylate or its caprolactone-modified product. Although the addition reaction is feasible even without any catalyst, it is also allowable to add a tin-based catalyst, such as dibutyltin dilaurate, or an amine-based catalyst, such as triethylamine, and the like, in order to advance the reaction efficiently.

A content proportion of Component (A) in the composition according to the present invention can be from 20 to 80 parts by mass, more preferably, from 30 to 70 parts by mass, with respect to a sum of Component (A), Component (B) and Component (C-1) or Component (C-2) being taken as 100 parts by mass. By setting a content proportion of Component (A) at from 20 to 80 parts by mass, cured films are obtainable which are excellent in terms of wear resistance and weatherability.

Component (B)

Component (B) is an isocyanuric ring-containing tri(meth)acrylate compound being free from any urethane bond that is expressed by following General Formula (2).

(Chemical Formula 6)

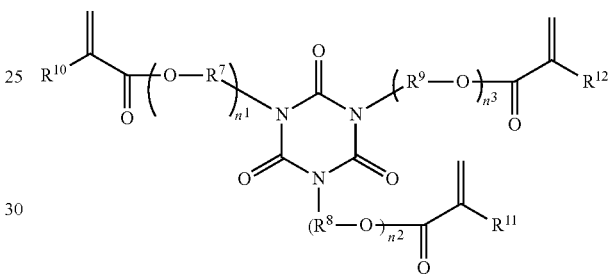

(2)

In General Formula (2), each of $R^7$, $R^8$ and $R^9$ expresses a divalent organic group whose number of carbon atoms is from 2 to 10 independently. As for a divalent organic group whose number of carbon atoms is from 2 to 10, an alkylene group, such as an ethylene group, a trimethylene group, a propylene group or a tetramethylene group, whose number of carbon atoms is from 2 to 4 is preferable. Moreover, compounds are also involved, compounds in which the compounds according to General Formula (2) that have one of these groups have been modified with ε-caprolactone. In this case, the divalent organic group whose number of carbon atoms is from 2 to 10 involves —$OCOCH_2CH_2CH_2CH_2CH_2$—. Of these, those in which all of $R^7$, $R^8$ and $R^9$ can respectively be an ethylene group are especially preferable, because it is possible to obtain cured films that are excellent in terms of wear resistance and weatherability especially.

In General Formula (2), each of $R^{10}$, $R^{11}$ and $R^{12}$ expresses a hydrogen atom, or a methyl group independently. Compounds, in which all of these can respectively be a hydrogen atom, are especially preferable, from the viewpoint that the resulting compositions turn into ones that are excellent in terms of curability.

In General Formula (2), each of $n^1$, $n^2$ and $n^3$ expresses a number of from 1 to 3 independently. However, $n^1+n^2+n^3=$from 3 to 9. As for $n^1$, $n^2$ and $n^3$, they can preferably be 1, respectively. As for $n^1+n^2+n^3$, it can preferably be 3.

Compound (B) can preferably be produced by reacting an alkylene oxide adduct of isocyanuric acid with a (meth)acrylic acid. Note that $n^1+n^2+n^3$ herein expresses an average number of alkylene oxides per one molecule of Compound (B).

A content proportion of Component (B) in the composition according to the present invention can be from 10 to 70 parts by mass, more preferably, from 20 to 60 parts by mass, with respect to a sum of Component (A), Component (B) and Component (C-1) or Component (C-2) being taken as 100 parts by mass. By setting a content proportion of Component (B) at 10 parts or more, it is possible to make the resulting initial adhesiveness satisfactory; and, by setting it at from 10 to 70 parts by mass, cured films are obtainable which are excellent in terms of wear resistance and weatherability.

Component (C-1)

Component (C-1) is an involatile component in reaction products being made by reacting an alkoxysilane compound (c1), which is expressed by following General Formula (3), with a colloidal silica (c2), in a mass ratio of from 9:1 to 1:9 between (c1) and (c2), and the involatile component involves those in which (c2) is modified chemically with (c1).

Note that, although the synthesis of Component (C-1) is usually carried out in a solvent, Component (C-1) can be components from which water and the organic solvent that have been employed in the reaction are excluded. Moreover, Component (C-1) can be components from which alcohols that alkoxysilanes are hydrolyzed to generate, and water that is generated by the condensation of silanols, are excluded. That is, Component (C-1) means an involatile component within reaction products. To put it differently, it means an Si-containing component.

(Chemical Formula 7)

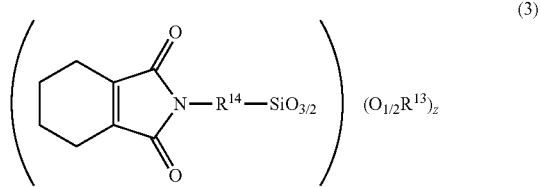

(3)

(In General Formula (3), $R^{13}$ expresses a hydrogen atom, or a monovalent organic group; $R^{14}$ expresses a divalent hydrocarbon whose number of carbon atoms is from 1 to 6; and "z" expresses a positive number of from 0.1 or more to 3 or less; moreover, when "z" is less than 3, the alkoxysilane compound (c1) involves a condensate, and $R^{13}$ within a molecule in the condensate may even involve two or more types of distinct groups.)

In General Formula (3), $R^{13}$ expresses a hydrogen atom, or a monovalent organic group. As for a monovalent organic group for $R^3$, the following can be given concretely: an alkyl group whose number of carbon atoms is from 1 to 6; an alkoxyalkyl group whose number of carbon atoms is from 1 to 6; and other organic groups comprising C, H and 0 atoms whose number of carbon atoms is from 1 to 6.

From the viewpoint of reactivity, $R^{13}$ can preferably be a hydrogen atom, or a monovalent organic group whose number of carbon atoms is from 1 to 6 and which may also have an oxygen atom; or can more preferably be a hydrogen atom, or an alkyl group whose number of carbon atoms is from 1 to 6.

In General Formula (3), $R^{14}$ expresses a divalent saturated hydrocarbon group whose number of carbon atoms is from 1 to 6, and can also have straight-chain or linear shapes or even have branches. As for a linear saturated hydrocarbon group, it is possible to exemplify an ethylene group, a 1,3-propylene group (or trimethylene group), a 1,4-buthylene group (or tetramethylene group), a 1,5-pentanediyl group (or pentam-ethylene group), and a 1,6-hexanediyl group (or hexamethylene group). As for a branched alkylene group, it is possible to exemplify a 1,2-propylene group, a 1,2-butylene group, a 1,3-buthylene group, a 2,3-butylene group, a 1,3-pentanediyl group, a 2,4-pentanediyl group, a 2,5-hexanediyl group, a 2-methyl-1,3-propylene group, a 2-ethyl-1,3-propylene group, and a 3-methyl-1,5-pentanediyl group.

As for $R^{14}$, a linear divalent saturated hydrocarbon group whose number of carbon atoms is from 3 to 6 is preferable especially.

From the viewpoint that cured substances resulting from the composition turn into ones which are excellent in terms of wear resistance and weatherability, the following can be an especially suitable option as $R^{14}$: a divalent saturated hydrocarbon group whose number of carbon atoms is from 1 to 6, or furthermore a linear divalent saturated hydrocarbon group whose number of carbon atoms is from 3 to 6.

In General Formula (3), "z" is a positive number, and satisfies 0.1≤"z"≤3. "z" expresses an average number of moles of residual alkoxy group per one mole of Si atom. When "z" is 3, (c1) represents an alkoxysilane monomer; and, when "z" is less than 3, it represents an alkoxysilane monomer condensate, or a mixture of an alkoxysilane monomer condensate and an alkoxysilane monomer.

By setting "z" at 0.1 or more, the colloidal silica is superficially modified effectively, and so the resulting cured substances turn into ones which are excellent in terms of scratch resistance. Moreover, from the standpoint of reactivity, "z" can preferably satisfy 0.4≤"z"≤3, or furthermore 0.8≤"z"≤3.

Note that it is possible to find the value of "z" from the integral ratio of hydrogen atom after measuring the $^1$H-NMR spectrum for (c1).

In a case where (c1) is a condensate, $R^{13}$ may even have two or more types of distinct chemical structures within in one molecule, respectively.

Note that, when a 3,4,5,6-tetrahydrophathalimide group for General Formula (3) absorbs an ultraviolet ray, the 3,4,5, 6-tetraphathalimide groups photo dimerize one another.

Explanations will be made on a preferable production process for said compound according to Formula (3). For example, a process comprising the following can be given: turning a carboxylic acid anhydride having a double bond, which is expressed by following General Formula (6), into an amic acid by adding an aminoalkyltrialkoxysilane, which is expressed by following General Formula (7), to the carboxylic acid anhydride; subjecting the resulting amic acid thereafter to ring closing to make a maleimide group by means of heating; and then subsequently reacting the alkoxy group with water that generates on the above occasion. This process is especially preferable, from such a viewpoint that, in accordance with the process, it is possible to produce (c1), which is suitable for the curing-type coating-agent composition according to the present invention, by a one-step reaction with use of raw materials, which are readily procurable.

(Chemical Formula 8)

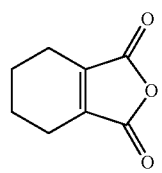

(6)

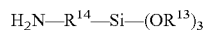

(7)

Note that, in General Formula (7), $R^{13}$ and $R^{14}$ are synonymous with those above-mentioned.

First of all, the amino group of an aminoalkyltrialkoxysilane (7) is added to a carboxylic acid anhydride (6) having a double bond, and thereby an amic acid (hereinafter, being referred to as "AMA") generates. Next, when heating a solution including the AMA, a ring-closing reaction proceeds, and thereby a maleimide group generates. Since water generates in the ring-closing reaction, a hydrolytic condensation reaction of the alkoxy group proceeds by means of that water.

Note herein that, in a case where the ring-closing reaction is complete and the generated water are consumed fully for the hydrolytic condensation reaction of alkoxysilane, "z" becomes 1 theoretically. "z" in Formula (3) can fall in a range of from 1 to 3. In a case where "z" is set at less than 1, a method of adding water to the reaction system can be given. On the other hand, in another case where "z" is set at more than 1, it is possible to adjust it so by removing water from the reaction system, or by employing a dewatering agent.

It is advisable that the aforementioned production process can be carried out in the presence of an organic solvent. As for the organic solvent, organic solvents are preferable which dissolve the AMA and which do not react with raw materials. To be concrete, an aromatic compound, such as toluene or xylene, is preferable. However, since the reaction between acid anhydride and amino group is very quick, it is possible to employ a polar solvent, such as alcohol or ester, as well.

As for a temperature of the ring-closing reaction, it can preferably fall in a range of from 70 to 150° C.

In a case where a compound that hardly dissolves water (namely, an aromatic compound, for instance) is employed as the organic solvent, it is preferable to carry out desolvating after completing the reaction.

As for a proportion between the carboxylic acid anhydride having a double bond and the aminoalkyltrialkoxysilane, it can preferably be equimolar to each other. As for the carboxylic acid anhydride having a double bond and as for the aminoalkyltrialkoxysilane, it is also possible to combinedly use a plurality of species for each of them.

(c2) is a colloidal silica; although it is possible to employ various species for it, one in which spherical particles are dispersed uniformly is preferable. For example, one in which they are dispersed uniformly in an alcohol-based solvent is more preferable.

As for an average primary particle diameter of (c2), it can preferably be from 1 to 100 nm, or can more preferably be from 5 to 60 nm; and it can especially preferably be from 5 to 30 nm. By setting an average primary particle diameter of (c2) at ones being larger than 1 nm, it is possible to turn (c2) into those which are excellent in terms of wear resistance; and, by setting it at ones being smaller than 100 nm, it is possible to turn (c2) into those which are excellent in terms of the dispersion stability in the resulting colloidal solution.

Note that, in the present invention, the "average primary particle diameter" means values that are calculated from specific surface areas in accordance with the BET method. Moreover, it is advisable that a specific surface area of (c2) can fall in a range of from 30 to 3,000 m²/g.

A preferable synthesis process for Component (C-1) can be a process that comprises the steps of charging (c1) and (c2) in a predetermined mass ratio, respectively, in the presence of an organic solvent including water; and thereafter heating them to undergo reactions. Although it is not possible to prescribe the heating temperature and time in general because they depend on the presence or absence of catalyst, the latter can desirably be from 0.5 to 20 hours when the former can be from 40 to 140° C., or desirably from 60 to 120° C.

In Component (C-1), not only silica fine particles which are modified superficially with (c1), but also hydrolytic condensates of (c1) that do not include any silica fine particles may even be included, and so those including them are defined as Component (C-1).

Moreover, the concept of Component (C-1) also involves reaction products as well that result from adding maleimide group-containing alkoxysilanes, which are synthesized from compounds being expressed by said Formula (6) and aminoalkylmethyldialkoxysilane in the same manner as (c1), or other alkoxysilane compounds, such as methyltrialkoxysilane, to (c1) and then reacting them with (c2). In this case, however, it is preferable that a charging amount of the other alkoxysilane compounds can be half or less of that of (c1).

Although a charging mass ratio between (c1) and (c2) can be from 1:9 to 9:1 upon synthesizing Component (C-1), it can more preferably be from 2:8 to 7:3, much more preferably from 2:8 to 6:4. By setting the mass ratio between (c1) and (c2) at from 1:9 to 9:1, it is possible to make the wear resistance and weatherability of the resulting cured films compatible with each other.

It is preferable that an amount of water to be charged into the reaction system can be from 0.3 to 10 mol, and it is more preferable that it can be from 0.5 to 5 mol, with respect to 1-mol alkoxy group in (c1). By setting the charging amount of water at from 0.3 to 10 mol with respect to 1-mol alkoxy group, it is possible to superficially modify the surface of silica fine particles efficiently without ever turning the silica fine particles into a gel.

As for the organic solvent, one which dissolves water uniformly is preferable; an alcohol-based solvent whose boiling point is from 100° C. to 200° C. is more preferable; and an alcohol-based solvent whose boiling point is from 100° C. to 200° C. and which has an ether bond is much more preferable.

As for concrete examples of the preferable organic solvent, the following can be given: propylene glycohol monomethylether; propylene glycohol monoethylether; propylene glycohol monopropylether; propylene glycohol monobutylether; ethylene glycohol monomethylether; ethylene glycohol monoethylether; ethylene glycohol monopropylether; and ethylene glycohol monobutylether.

Note that, although Component (C-1) can be produced without any catalyst, it is advisable to add an acid catalyst or alkali catalyst.

After completing the reaction, it is allowable to remove water that is included within the reaction system. It is permissible to heat and/or depressurize the post-reaction solution in order to remove water and furthermore to distill away the organic solvent. On this occasion, it is preferable to add another organic solvent, whose boiling point is higher than that of water, to the post-reaction solution.

A content proportion of Component (C-1) in the composition according to the present invention can be from 1 to 35 parts by mass, can more preferably be from 1 to 30 parts by mass, can much more preferably be from 3 to 25 parts by mass, or can especially preferably be from 5 to 20 parts by mass, with respect to a sum of Component (A), Component (B) and Component (C-1) being taken as 100 parts by mass.

By setting the content proportion of Component (C-1) at from 1 to 35 parts by mass, it is possible to adapt the composition into one from which cured films that are excellent in terms of wear resistance and weatherability are obtainable. When the proportion of Component (C-1) is 1 part by mass or more, the wear resistance of the resulting cured films upgrades. However, when Component (C-1) is too much, the weatherability declines because the resultant cured films become likely to contract or because decompositions of organic segments in the resulting cured films become quick.

Component (C-2)

Component (C-2) according to the present invention is an organosilicon compound being obtainable by subjecting a silicon compound (c3) and another silicon compound (c4) whose structures differ one another to hydrolytic copolycondensation.

A silicon compound (c3) is expressed by following General Formula (4).

(Chemical Formula 9)

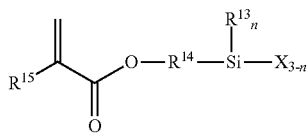

(4)

In General Formula (4), $R^{13}$ is an organic group having an alkyl group whose number of carbon atoms is from 1 to 6, an aralkyl group whose number of carbon atoms is from 7 to 10, or an aryl group whose number of carbon atoms is from 6 to 10.

Among those above, an alkyl group whose number of carbon atoms is from 1 to 6 is preferable; and a methyl group is more preferable, from the viewpoint that cured films of the obtainable composition are good in terms of wear resistance.

$R^{14}$ is a divalent saturated hydrocarbon group whose number of carbon atoms is from 1 to 6, and an alkylene group is preferable. As for an alkylene group, a trimethylene group is more preferable, and is preferred not only because cured films being excellent in terms of wear resistance are obtainable but also from the viewpoint of raw-material cost. $R^{15}$ is a hydrogen atom, or a methyl group.

"X" is a hydrolyzable group, and "X"s may be identical with each other, or may be distinct from one another. As for a hydrolyzable group, various groups are feasible as far as they are a group having hydrolyzability. To be concrete, the following can be given: a hydrogen atom, an alkoxy group, a cycloalkoxy group, an aryloxy group, and an arylalkoxy group. Even among these, an alkoxy group is preferable, and an alkoxy group whose number of carbon atoms is from 1 to 6 is more preferable. As for concrete examples of the alkoxy group, the following can be given: a methoxy group, an ethoxy group, a propoxy group, a butoxy group, a pentyloxy group, and hexyloxy group.

Moreover, "n" is 0 or 1, and can preferably be 0, from the viewpoint that obtainable cured films are excellent in terms of wear resistance.

In General Formula (4), as for concrete examples of a compound whose "n" is 0 and "X" is an alkoxy group, one of the preferable compounds, the following can be given: 2-(meth)acryloyloxy ethyltriethoxysilane, 3-(meth)acryloyloxy propyltrimethoxysilane, and 3-(meth)acryloyloxy propylethyltriethoxysilane.

A silicon compound (c4) is expressed by following General Formula (5).

$SiY_4$ (5)

In General Formula (5), "Y" is a siloxane-bond generation group, and "Y"s within a molecule may also be identical with each other, or may even be distinct from one another.

As for a siloxane-bond generation group, an alkoxy group is preferable. As for preferred examples of the alkoxy group, an alkoxy group, such as a methoxy group, an ethoxy group, a n-propoxy group, an iso-propoxy group, a n-butoxy group and a sec-butoxy group, whose number of carbon atoms is from 1 to 4 can be given.

Preferred concrete examples of compound (c4) can be alkoxysilane compounds, such as tetra-n-propoxysilane, trimethoxy-n-propoxysilane, dimethoxy-di-n-propoxysilane, and methoxy-tri-n-propoxysilane, which have a n-propoxy group.

A n-propoxy group-containing alkoxysilane compound may also be one type of the compounds, or may even be a mixture of the compounds having a n-propoxy group and the other alkoxy groups.

Although it is also possible to employ a mixture of n-propoxy group-containing alkoxysilane compounds by mixing plural species of the components, it is even possible to employ those having been produced by means of alcohol exchange as they are. For example, it is possible to obtain one of the mixtures by subjecting a compound (namely, tetramethoxysilane, for instance), which is a silicon compound being expressed by aforementioned General Formula (5) and which does not have any n-propoxy group, to an alcohol-exchange reaction in 1-propanol. Moreover, it is possible to use reaction products having been obtained by means of this reaction as they are.

A synthesis of Component (C-2) may be done by subjecting aforementioned silicon compound (c3) and aforementioned silicon compound (c4), which are set at a predetermined proportion respectively, to hydrolytic copolycondensation under an alkaline condition.

Hereinafter, a step in which this hydrolytic copolycondensation is carried out will be labeled a "first step."

A proportion between silicon compound (c3) and silicon compound (c4) can be from 0.3 to 1.8 mol of silicon compound (c4), preferably, from 0.8 to 1.8 mol thereof, more preferably, from 1 to 1.8 mol thereof, with respect to 1 mol of silicon compound (c3). Reacting them one another in this range makes the hydrolytic copolycondensation proceed satisfactorily, so that it is possible to efficiently produce Component (C-2) without causing any gelation to occur during the reaction, and after the reaction. Component (C-2) being produced without ever undergoing gelation upgrades the dispersibility when being mixed as a composition, and eventually upgrades the appearance of the resulting cured films.

It is preferable that the aforementioned first step can be a reaction under an alkaline condition, and it is advisable that the pH of a reaction liquid may be a value exceeding 7. The pH of a reaction liquid can preferably be 8 or more, more preferably, the pH can be 9 or more. Note that the upper limit is usually pH 13. By means of setting up one of the aforementioned pHs in the reaction system, it is possible to produce Component (C-2) being excellent in terms of preservation stability with a higher yield.

Organosilicon compounds, which are obtainable by subjecting them to the hydrolytic copolycondensation under an acidic condition (i.e., less than pH 7), are not preferable, because they turn into ones which are poor in terms of preservation stability and because they might possibly undergo gelation during storage depending on reaction conditions, and so on.

Moreover, under a neutral condition (i.e., at around pH 7), the hydrolytic copolycondensation reaction is less likely to proceed, so that it is not possible to efficiently produce the present organosilicon compound.

It is possible to set condensed ratios of compound (c3) and compound (c4) in the first step at 92% or more, more preferably, from 95% or more, much more preferably, 98% or more, respectively. Although it is most preferable that all of the siloxane-bond generation groups, including the hydrolyzable groups, can be condensed virtually, the upper limit of the condensed ratios is usually 99.9%.

Production processes, and the like, under acidic conditions, as well as processes for producing organosilicon compound have been known, however, it has been difficult to react the two, compound (c3) and compound (c4), in the raw-material compounds uniformly one another, and they have been those in which gels are likely to arise. Consequently, a method for avoiding gelation has been known in which a silicon compound (hereinafter, being referred to as an "'M' monomer") having one siloxane-bond generation group only, such as trimethylalkoxysilane or hexamethyldisiloxane, is caused to act as a terminal-end sealant.

However, although it is even possible to avoid gelation by combinedly using an "M" monomer in a predetermined amount or more, the inorganic qualities of obtainable organosilicon compounds tend to decline.

On the contrary, being a reaction under an alkaline condition as described above leads to making it possible to cause compound (c3) and compound (c4) to undergo copolycondensation, without ever causing them to undergo gelation. Besides that, since the resulting inorganic qualities can be maintained, such an advantage can be taken effect as not causing the wear resistance of cured films, which are obtainable from the resultant composition, to decline.

Component (C-2) is one which is produced by said first step that is indispensable, however, it is possible to further include the following steps, if needed:

Second Step: a step of neutralizing a reaction liquid being obtained at the first step by means of acid;

Third Step: a step of removing volatile components from a neutralized liquid being obtained at the second step;

Fourth Step: a step of dissolving Organosilicon Compound (C) in an organic solvent for washing by mixing and contacting a condensate being obtained at the third step and the organic solvent for washing one another;

Fifth Step: a step of obtaining an organic solution including Organosilicon Compound (C) after washing an organic-system liquid being obtained at the fourth step by means of water; and Sixth Step: a step of removing volatile components from the organic solution being obtained at the fifth step.

It is possible to add a polymerization inhibitor, which inhibits the polymerization of (meth)acryloyl group, to at least one of the above-mentioned reaction systems, namely, the reaction liquid, the neutralized liquid, the organic-system liquid and the organic solution that include Component (C-2).

As for the production process for Component (C-2), it is preferable to include the first step, the second step, and the fifth step at least.

A content proportion of Component (C-2) in the composition according to the present invention can be from 5 to 35 parts by mass, or can more preferably be from 10 to 30 parts by mass, with respect to a sum of Component (A), Component (B) and Component (C-2) being taken as 100 parts by mass.

By setting the content proportion of Component (C-2) at from 5 to 35 parts by mass, it is possible to adapt the composition into one from which cured films that are excellent in terms of wear resistance and weatherability are obtainable. When the proportion of Component (C-2) is 5 parts by mass or more, the wear resistance of the resulting cured films upgrades. However, when Component (C-2) is present too much, the weatherability declines because the resultant cured films become likely to contract, or because decompositions of organic segments in the resulting cured films become quick.

Component (D): Radical-Polymerization Initiator

Component (D) according to the present invention is a radical-polymerization initiator, and it is possible to employ various compounds for it.

When a photo radical-polymerization initiator is employed as Component (D), the resulting composition works as a light curing-type coating-agent composition, and is cured by means of light irradiation. When a thermal radical-polymerization initiator is used as Component (D), the resultant composition works as a thermal curing-type coating-agent composition, and is cured by means of heating.

It is preferable that the composition according to the present invention can be a light curing-type coating-agent composition in which a photo radical-polymerization initiator is employed as Component (D), from such a viewpoint that it makes curing with lower energy and for a shorter period of time feasible, or it is excellent in terms of curability, and the like.

As for concrete examples of the photo radical-polymerization initiator, the following can be given: acetophenone based compounds, such as 2,2-dimethoxy-1,2-diphenylethane-1-one, 1-hydroxycyclohexyl-phenyl-ketone, 2-hydroxy-2-methyl-1-phenyl-propane-1-one, 1-[4-(2-hydroxyethoxy)-phenyl]-2-hydroxy-2-methyl-1-propane-1-one, 2-methyl-1-[4-(methylthio)phenyl]-2-morpholinopropane-1-one, 2-benzyl-2-dimethylamino-1-(4-morpholinophenyl)-butane-1-one, diethoxyacetophenone, oligo{2-hydroxy-2-methyl-1-[4-(1-methylvinyl)phenyl]propanone} and 2-hydroxy-1-{4-[4-(2-hydroxy-2-methylpropionyl)benzyl]phenyl}-2-methyl-propane-1-one; benzophenone-based compounds, such as benzophenone, 4-phenylbenzophenone, 2,4,6-trimethylbenzophenone and 4-benzoyl-4'-methyl-diphenylsulfide; α-ketoester-based compounds, such as methyl benzoylformate, 2-(2-oxo-2-phenylacetoxyethoxy)ethyl ester of oxyphenyl acetic acid and 2-(2-hydroxyethoxy)ethyl ester of oxyphenyl acetic acid; phosphine oxide-based compounds, such as 2,4, 6-trimethylbenzoyl diphenyl phosphine oxide, bis(2,4,6-trimethylbenzoyl)-phenylphosphine oxide, bis(2,6-dimethoxybenzoyl)-2,4,4-trimethylpentyl phosphine oxide; benzoin-based compounds, such as benzoin, benzoin methyl ether, benzoin ethyl ether, benzoin isopropyl ether and benzoin isobutyl ether; titanocene-based compounds; acetophenone/benzophenone-hybrid-based photo initiators, such as 1-[4-(4-benzoylphenylsulfanyl)phenyl]-2-methyl-2-(4-methylphenylsulfinyl)propane-1-one; and oxime ester-based photo polymerization initiators, such as 2-(O-benzoyloxime)-1-[4-(phenylthio)]-1,2-octanedione; as well as camphorquinone.

As for concrete examples of the thermal radical-polymerization initiator, an organic peroxide, and an azo-based compound, and the like, can be named.

As for concrete examples of the organic peroxide, the following can be given: 1,1-bis(t-butylperoxy)2-methylcyclohexane, 1,1-bis(t-hexylperoxy)-3,3,5-trimethylcyclohexane, 1,1-bis(t-hexylperoxy)cyclohexane, 1,1-bis(t-butylperoxy)-3,3,5-trimethylcyclohexane, 1,1-bis(t-butylperoxy) cyclohexane, 2,2-bis(4,4-di-butylperoxycyclohexyl) propane, 1,1-bis(t-butylperoxy)cyclododecane, t-hexylperoxy isopropyl monocarbonate, t-butylperoxymaleic acid, t-butylperoxy-3,5,5-trimethylhexanoate, t-butyl peroxylaurate, 2,5-dimethyl-2,5-di(m-toluoylperoxy)hexane, t-butylperoxy isopropyl monocarbonate, t-butylperoxy 2-ethylhexyl monocarbonate, t-hexyl peroxybenzoate, 2,5-dimethyl-2,5-di(benzoylperoxy)hexane, t-butyl peroxyacetate, 2,2-bis(t-butylperoxy)butane, t-butyl peroxybenzoate, n-butyl-4,4-bis(t-butylperoxy)valerate, di-t-butyl peroxyisophthalate, α,α'-bis(t-butylperoxy)diisopropylbenzene, dicumyl peroxide, 2,5-dimethyl-2,5-di(t-butylperoxy)hexane, t-butyl cumyl peroxide, di-t-butyl peroxide, p-menthanehydroperoxide, 2,5-dimethyl-2,5-di(t-butylperoxy)-3-hexyne, diisopropylbenzene hydroperoxide, t-butyl trimethylsilyl peroxide, 1,1,3,3-tetramethylbutyl hydroperoxide, cumene hydroperoxide, t-hexyl hydroperoxide, and t-butyl hydroperoxide.

As for concrete examples of the azo-based compound, the following can be given: 1,1'-azobis(cyclohexane-1-carbonitrile), 2-(carbamoylazo)isobutyronitrile, 2-phenylazo-4-methoxy-2,4-dimethylvaleronitrile, azo di-t-octane, and azo di-t-butane.

It is also allowable to use one of the above-enumerated radical-polymerization initiators independently, or it is even permissible to use two or more of them combinedly. Moreover, it is also feasible to make the organic peroxides redox catalysts by means of combining them with a reducing agent.

A content proportion of Component (D) in the composition according to the present invention can be from 0.1 to 10 parts by mass, can more preferably be from 0.5 to 5 parts by mass, or can especially preferably be from 1 to 3 parts by mass, with respect to a sum of Component (A), Component (B) and Component (C-1) or Component (C-2) being taken as 100 parts by mass.

By setting the content proportion of Component (D) at from 0.1 to 10 parts by mass, the resulting composition becomes one which is excellent in terms of curability, and so cured films are obtainable which are excellent in terms of wear resistance and weatherability.

Component (E): Ultraviolet Absorber

Component (E) according to the present invention is an ultraviolet absorber, and it is possible to employ various compounds or substances for it.

As for concrete examples of the ultraviolet absorber, the following can be given: triazine-based ultraviolet absorbers, such as 2-[4-[(2-hydroxy-3-dodecyloxypropyl)oxy]-2-hydroxyphenyl]-4,6-bis(2,4-dimethylphenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, 2-[4-[(2-hydroxy-3-(2-ethylhexyloxy)propyl)oxy]-2-hydroxyphenyl]-4,6-bis(2,4-dimethylphenyl)-1,3,5-triazine, 2,4-bis(2-hydroxy-4-butyloxyphenyl)-6-(2,4-bis-butyloxy phenyl)-1,3,5-triazine, and 2-(2-hydroxy-4-[1-octyloxycarbonylethoxy]phenyl)-4,6-bis(4-phenylphenyl)-1,3,5-triazine; benzotriazole-based ultraviolet absorbers, such as 2-(2H-benzotriazol-2-yl)-4,6-bis(1-methyl-1-phenyl-ethyl)phenol, 2-(2-hydroxy-5-tert-butylphenyl)-2H-benzotriazole, and 2-[2-hydroxy-5-(2-(meth)acryloyloxyethyl)phenyl]-2H-benzotriazole; benzophenone-based ultraviolet absorbers, such as 2,4-dihydroxybenzophenone, and 2-hydroxy-4-methoxybenzophenone; cyanoacrylate-based ultraviolet absorbers, such as ethyl-2-cyano-3,3-diphenylacrylate, and octyl-2-cyano-3,3-diphenylacrylate; and inorganic fine particles, such as titanium oxide fine particles, zinc oxide fine particles, and tin oxide fine particles, which absorb ultraviolet rays.

It is also allowable to use one of the above-enumerated ultraviolet absorbers independently, or it is even permissible to use two or more of them combinedly.

Of those above, the benzotriazole-based ultraviolet absorbers, which have a (meth)acryloyl group, are especially preferable, from such a viewpoint that they make the weatherability and wear resistance of the resulting cured films compatible with each other.

A content proportion of Component (E) in the composition according to the present invention can be from 1 to 12 parts by mass, or can more preferably be from 3 to 12 parts by mass, with respect to a sum of Component (A), Component (B) and Component (C-1) or Component (C-2) being taken as 100 parts by mass.

By setting the content proportion of Component (E) at from 1 to 12 parts by mass, it is possible to make the wear resistance and weatherability of the resulting cured films compatible with each other. When Component (E) is less than 1 part by mass, no cured films, which exhibit weatherability sufficiently, are obtainable. On the other hand, when Component (E) is too much, not only because the wear resistance of the resultant cured films declines, but also because the weatherability also tends to decline, Component (E) is set at 12 parts by mass or less. In particular, by setting the content proportion of Component (E) at from 3 to 12 parts by mass, cured films, in which excellent wear resistance and weatherability are made compatible with each other, are obtainable.

Component (F): Organic Solvent

Component (F) according to the present invention is a solvent, and it is possible to employ various compounds for it.

As for Component (F), it is preferable to use one which can uniformly disperse or dissolve Component (A), Component (B), Component (C-1) or Component (C-2), Component (D) and Component (E), and additionally the other components being described later.

As for concrete examples of preferable solvents, the following can be given: alcohols, such as ethanol, and isopropanol; alkylene glycol monoethers, such as ethylene glycol monomethylether, propylene glycol monomethylether, propylene glycol monoethylether, propylene glycol monopropylether, and propylene glycol monobutylether; aromatic compounds, such as toluene, and xylene; esters, such as propylene glycol monomethylether acetate, ethyl acetate, and butyl acetate; ketones, such as acetone, methyl ethyl ketone, and methyl isobutyl ketone; ethers, such as dibutyl ether; and diacetone alcohol; as well as N-methylpyrrolidone. Of these, the alkylene glycol monoethers, such as propylene glycol monomethylether, are especially preferable, not only because they are excellent in terms of dispersibility or solubility for each of the respective components, but also because, in a case where the resinous substrate, onto which the composition according to the present invention is applied, is made of polycarbonate resins, they do not dissolve the polycarbonate resins.

Moreover, a method is also applicable preferably in which a solvent, such as alcohols or alkylene glycol monoethers, being incapable of dissolving polycarbonate resins, is mixed with another solvent, such as esters or ketones, being capable of dissolving polycarbonate resins so as not to dissolve a resinous substrate being made of polycarbonate resin at the time of application but to melt the resinous substrate's surface on the order of micrometer at a subsequent heating step, thereby enhancing the adhesiveness of the resulting paint films. In addition, another method is applicable preferably as well in which solvents with various boiling points are mixed with each other, thereby enhancing the smoothness or flatness of the resultant paint films' surface.

A content proportion of Component (F) in the composition according to the present invention can be from 10 to 1,000 parts by mass with respect to a sum of Component (A), Component (B) and Component (C-1) or Component (C-2) being taken as 100 parts by mass. When a blending amount of Component (F) is too less, it is less likely to carry out coating uniformly; whereas it is less likely to obtain cured films with a sufficient thickness when it is too much. Therefore, the content proportion of Component (F) can preferably be from 50 to 500 parts by mass, or can more preferably be from 50 to 300 parts by mass, when prescribing it daringly, from the standpoint of productivity, although it is advisable to appropriately select the content proportion depending on coating methods.

Note that the content proportion of Component (F) shall involve organic solvents, which are present at the time of preparing the composition along with not only Components (A) through (E) but also later-described Component (G) and Component (H) as well as the other components.

Component (G): Hindered Amine-Based Light Stabilizer

Although the composition according to the present invention is one to which said Components (A) through (F) are indispensable, it is advisable to further blend a hindered amine-based light stabilizer (G) (hereinafter, being referred to as "Component (G)") in order to upgrade the weatherability.

As for concrete examples of the hindered amine-based light stabilizer, the following hindered amine-based light stabilizers can be given: bis(1,2,2,6,6-pentamethyl-4-piperidinyl) sebacate, methyl (1,2,2,6,6-pentamethyl-4-piperidinyl) sebacate, 2,4-bis[N-butyl-N-(1-cyclohexyloxy-2,2,6,6-tetramethyl-piperidin-4-yl)amino]-6-(2-hydroxyethylamine)-1,3,5-triazine, and decanedioic acid bis(2,2,6,6-tetramethyl-1-(octyloxy)-4-piperidinyl) ester.

Of these, those whose basicity of hindered amine is lower are preferable, from the viewpoint of the resulting composition's stability. To be concrete, those having an aminoether group, namely, so-called NOR-type ones, are more preferable.

A content proportion of Component (G) can preferably be from 0.05 to 1.5 parts by mass, or furthermore from 0.1 to 1.5 parts by mass, with respect to a sum of Component (A), Component (B) and Component (C-1) or Component (C-2) being taken as 100 parts by mass.

Component (H): Surface Modifier

In order to enhance leveling property at the time of applying, or in order to enhance the sliding property of the resulting cured films to enhance the scratch resistance, it is also advisable to further add various surface modifiers to the composition according to the present invention. As for the surface modifiers, it is possible to employ various additives for modifying superficial properties, which are commercially available under such a name as a surface-modifying agent, a leveling agent, a sliding-property imparting agent, or an antifouling-property imparting agent, and the like. Of those, silicone-based surface modifiers, and fluorine-based surface modifiers are suitable.

As for their concrete examples, the following can be given: silicone-based polymers and oligomers, which have a silicone chain and polyalkylene oxide chain; silicone-based polymers and oligomers, which have a silicone chain and polyester chain; fluorine-based polymers and oligomers, which have a perfluoroalkyl group and polyalkylene oxide chain; and fluorine-based polymers and oligomers, which have a perfluoroalkyl ether chain and polyalkylene oxide chain. It is allowable to employ one or more types of these. For the purpose of enhancing and so forth the sustainability of the resulting sliding property, it is also permissible to employ one which contains a (meth)acryloyl group within the molecule.

A preferable blending amount of the surface modifier can be from 0.01 to 1.0 part by mass with respect to a sum of Component (A), Component (B) and Component (C-1) or Component (C-2) being taken as 100 parts by mass. By setting the blending amount of the surface modifier at from 0.01 to 1.0 part by mass, it is possible to enhance the superficial flatness or smoothness of the resulting paint films.

Other Components

Although the composition according to the present invention is one to which said Components (A) through (F) are indispensable, it is possible to further blend various components in compliance with objectives. It is also allowable to blend one of aforementioned Component (G), Component (H) and below-enumerated other component independently, or it is even permissible to blend two or more species of them.

For the purpose of making the preservation stability of the composition according to the present invention satisfactory, it is preferable to add a radical-polymerization inhibitor to it.

As for concrete examples of the polymerization inhibitor, the following can be given: hydroquinone, tert-butylhydroquinone, hydroquinone monomethyl ether, 2,6-di-tert-butyl-4-methyl phenol, 2,4,6-tri-tert-butyl phenol, benzoquinone, phenothiazine, N-nitroso phenylhydroxylamine, ammonium salts of N-nitroso phenylhydroxylamine, aluminum salts of N-nitroso phenylhydroxylamine, copper dibutyldithiocarbamate, copper chloride, and copper sulfate.

It is preferable to set an addition amount of the polymerization inhibitor at from 10 to 10,000 ppm, or it can more preferably be from 100 to 3,000 ppm, with respect to a sum of Component (A), Component (B), and Component (C-1) or Component (C-2) being taken as 100 parts by mass.

For the purpose of making the heat resistance and weatherability of the resulting cured films satisfactory, it is also advisable to further blend various oxidation inhibitors to the composition according to the present invention. As for some of the oxidation inhibitors, primary oxidation inhibitors, such as hindered phenol-based oxidation inhibitors; and sulfur-based and phosphorous-based secondary oxidation inhibitors can be named.

As for concrete examples of the primary oxidation inhibitors, the following can be given: pentaerythritol tetrakis[3-(3,5-di-tert-butyl-4-hydroxyphenyl)propionate], ethylene bis(oxyethylene) bis[3-(5-tert-butyl-4-hydroxy-m-tolyl) propionate], and 1,3,5-tris[(4-tert-butyl-3-hydroxy-2,6-xylyl)methyl]-1,3,5-triazine-2,4,6(1H,3H,5H)-trione.

As for concrete examples of the secondary oxidation inhibitors, the following can be given: didodecyl 3,3'-thiodipropionate, 4,6-bis(octylthiomethyl)-o-cresol, and tris(2,4-di-tert-butylphenyl)phosphite.

A preferable blending amount of the oxidation inhibitors can be from 0 to 5 parts by mass, or more preferably from 0 to 3 parts by mass, with respect to a sum of Component (A), Component (B) and Component (C-1) or Component (C-2) being taken as 100 parts by mass.

It is also advisable to further add a compound, which is other than Component (A) and Component (B) and which has one or more radically-polymerizable unsaturated groups within one molecule, to the composition according to the present invention.

The compound having one radically-polymerizable unsaturated group within one molecule (hereinafter, being referred to as "monofunctional unsaturated compound") can be blended in order to enhance the adhesiveness between the resinous substrate and the resulting cured films.

As for the radically-polymerizable unsaturated group in the monofunctional unsaturated compound, a (meth)acryloyl group is preferable.

As for a blending proportion of the monofunctional unsaturated compound, it is preferable to set it at 20 parts by mass or less with respect to a sum of Component (A), Component (B) and Component (C-1) or Component (C-2) being taken as 100 parts by mass, from the standpoint of preventing the resulting wear resistance and weatherability from worsening.

As for concrete examples of the monofunctional unsaturated compound, the following can be given: (meth)acrylic acid, Michael addition-type dimers of acrylic acid, ω-carboxy-polycaprolactone mono(meth)acrylate, monohydroxylethyl phthalate (meth)acrylate, methyl (meth)acrylate, ethyl (meth)acrylate, butyl (meth)acrylate, 2-ethylhexyl (meth)acrylate, benzyl (meth)acrylate, phenyl (meth)acrylate, phenol-alkylene oxide adduct (meth)acrylate, alkylphenol-alkylene oxide adduct (meth)acrylate, cyclohexyl (meth)acrylate, tert-butylcyclohexyl (meth)acrylate, 2-hydroxyethyl (meth)acrylate, 2-hydroxypropyl (meth)acrylate, 4-hydroxybutyl acrylate, paracumylphenol-alkylene oxide adduct (meth)acrylate, orthophenylphenol (meth)acrylate, orthophenylphenol-alkylene oxide adduct (meth)acrylate, tetrahydrofurfuryl (meth)acrylate, isobornyl (meth)acrylate, tricyclodecanemethylol (meth)acrylate, 2-hydroxy-3-phenoxypropyl (meth)acrylate, N-(2-(meth)acryloxyethyl)hexahydrophthalimide, N-(2-(meth)acryloxyethyl)tetrahydrophthalimide, N,N-dimethyl acrylamide, acryloylmorpholine, N-vinylpyrrolidone, and N-vinylcaprolactam.

In the composition, it is also advisable to further blend another compound having two or more radically-polymerizable unsaturated groups within one molecule (hereinafter, being referred to as "multi-functional unsaturated compound"). Including such a multi-functional compound may lead to a case where the adhesiveness between the resulting cured films and the resinous substrate as well as the wear resistance of the resultant cured films can be improved.

It is preferable that a number of the radically-polymerizable unsaturated groups in the multi-functional unsaturated compound can be 3 or more within one molecule, and can more preferably be from 4 to 20, in order not to decline the resulting wear resistance.

As for a blending proportion of the multi-functional unsaturated compound, it is preferable to set it at 20 parts by mass or less with respect to a sum of Component (A), Component (B) and Component (C-1) or Component (C-2) being taken as 100 parts by mass, from the standpoint of preventing the resulting weatherability from worsening.

As for the multi-functional unsaturated compound, a compound having two or more (meth)acryloyl groups within one molecule is preferable. As for its concrete examples, the following compounds can be given: bisphenol A-alkylene oxide adduct di(meth)acrylate, bisphenol F-alkylene oxide adduct di(meth)acrylate, bisphenol Z-alkylene oxide adduct di(meth)acrylate, bisphenol S-alkylene oxide adduct di(meth)acrylate, thiobisphenol-alkylene oxide adduct di(meth)acrylate, bisphenol A di(meth)acrylate, bisphenolFdi(meth)acrylate, bisphenol Zdi(meth)acrylate, bisphenol S di(meth)acrylate, thiobisphenol di(meth)acrylate, tricyclodecanedimethylol di(meth)acrylate, ethylene glycol di(meth)acrylate, polyethylene glycol di(meth)acrylate, propylene glycol di(meth)acrylate, polypropylene glycol di(meth)acrylate, neopentyl glycol di(meth)acrylate, 1,6-hexanediol di(meth)acrylate, 1,9-nonanediol di(meth)acrylate, glycerine di(meth)acrylate, glycerine-alkylene oxide adduct di(meth)acrylate, dimer acid diol di(meth)acrylate, cyclohexanedimethylol di(meth)acrylate, trimethylolpropane tri(meth)acrylate, trimethylolpropane-alkylene oxide adduct tri(meth)acrylate, pentaerythritol tri- and tetra-acrylates, pentaerythritol-alkylene oxide adduct tri- and tetra-acrylates, ditrimethylolpropane tetra(meth)acrylate, dipentaerythritol hexa- and penta-acrylates, polyester (meth)acrylate, epoxy (meth)acrylate, urethane (meth)acrylate, and silicone resins having a (meth)acryloyl group at the ends.

As for the polyester (meth)acrylate, dehydrated condensates between polyester polyol and (meth)acrylic acid can be named. As for the polyesterpolyol, reactionproducts between low-molecular-weight polyols and dicarboxylic acids and their anhydrides can be named. Moreover, the low-molecular-weight polyols can be ethylene glycol, polyethylene glycol, cyclohexanedimethylol, 3-methyl-1,5-pentanediol, propylene glycol, polypropylene glycol, 1,6-hexanediol, and trimethylolpropane, as well as alkylene oxide adducts of these low-molecular-weight polyols. In addition, the dicarboxylic acids can be adipic acid, succinic acid, phthalic acid, hexahydrophthalic acid, and terephthalic acid. Moreover, dehydrated condensates between various dendrimer-type polyols and (meth)acrylic acid can be named.

As for the epoxy (meth)acrylate, the following can be given: (meth)acrylic acid adducts of bisphenol type-A epoxy resins, (meth)acrylic acid adducts of hydrogenated bisphenol type-A epoxy resins, (meth)acrylic acid adducts of phenol or cresol novolac-type epoxy resins, (meth)acrylic acid adducts of biphenyl-type epoxy resins, (meth)acrylic acid adducts to diglycidyl ether of polyether, such as polytetramethylene glycol, (meth)acrylic acid adducts to diglycidyl ether of polybutadiene, (meth)acrylic acid adducts of internal epoxide in polybutadiene, (meth)acrylic acid adducts of silicone resins having an epoxy group, (meth)acrylic acid adducts of limonene dioxide, and (meth)acrylic acid adducts of 3,4-epoxycyclohexylmethyl-3,4-epoxycyclohexanecarboxylate.

As for the urethane (meth)acrylate, the following can be given: compounds in which organic polyisocyanate and hydroxyl group-containing (meth)acrylate have undergone an addition reaction; and compounds in which organic polyisocyanate, polyol and hydroxyl group-containing (meth)acrylate have undergone an addition reaction.

Here, as for some of the polyols, the following can be given: low-molecular-weight polyols, polyether polyol, polyester polyol, and polycarbonate polyol.

As for some of the low-molecular-weight polyols, the following can be given: ethylene glycol, propylene glycol, neopentyl glycol, cyclohexanedimethylol, 3-methyl-1,5-pentanediol, and glycerin.

As for the polyether polyol, polypropylene glycol, and polytetramethylene glycol can be named.

As for the polyester polyol, reaction products can be named, reaction products which are made between those low-molecular-weight polyols (and/or the polyetherpolyols) and dicarboxylic acids, such as adipic acid, succinic acid, phthalic acid, hexahydrophthalic acid and terephthalic acid, or their anhydrides.

As for the organic polyisocyanate, the following can be given: tolylene diisocyanate, xylylene diisocyanate, tetramethylxylylene diisocyanate, 4,4'-diphenylmethane diisocyanate, 4,4'-dicyclohexylmethane diisocyanate, hexamethylene diisocyanate, and isophorone diisocyanate.

As for the hydroxyl group-containing (meth)acrylate, the following can be given: hydroxyalkyl (meth)acrylate, such as 2-hydroxyethyl (meth)acrylate, 2-hydroxypropyl (meth) acrylate, and 4-hydroxybutyl (meth)acrylate; or hydroxyl group-containing multi-functional (meth)acrylate, such as pentaerythritol tri(meth)acrylate, and dipentaerythritol penta (meth)acrylate.

It is also allowable to use one of the above-enumerated unsaturated compounds independently, or it is even permissible to use two or more of them combinedly.

For the purpose of reducing warpage at the time of curing while maintaining transparency, and the like, it is also possible to further blend an organic polymer into the composition according to the present invention. As for a suitable polymer, (meth)acryl-based polymers can be named. As for a suitable constituent monomer, the following can be given: methyl (meth)acrylate, cyclohexyl (meth)acrylate, (meth)acrylic acid, glycidyl (meth)acrylate, and N-(2-(meth)acryloxy-ethyl)tetrahydrophthalimide. In a case where polymers are made by copolymerizing (meth)acrylic acid, it is also advisable to introduce a (meth)acryloyl group into the polymer chain by adding glycidyl (meth)acrylate to it.

Preparation Method

It is possible to produce the composition according to the present invention by weighing Components (A) through (F), which have been explained already, as well as the other components, such as Component (G) and Component (H), if needed, in a predetermined amount, respectively, and then stirring and mixing them.

Coating Method and Curing Method

The curing-type coating-agent composition according to the present invention is applied onto a surface of substrate to which it is desired to impart wear resistance and weatherability.

As for a substrate to which the composition according to the present invention is applicable, it is possible to name plastic, metal, or concrete, and the like, because the composition is applicable to various materials being employed outside. Moreover, there are not any limitations on the substrate's configuration.

The composition according to the present invention is applicable preferably to plastic being employed outside especially. As for concrete examples of the plastic, the following can be given: polycarbonate resins, polymethyl methacrylate, polyethylene terephthalate, polyvinyl chloride, epoxy resins, and polyurethane resins. However, more preferable ones are polycarbonate resins, and polymethyl methacrylate; and especially preferable ones are polycarbonate resins.

It is allowable to follow conventional methods to do a coating method for the curing-type coating-agent composition according the present invention. For example, the following are preferable: spraying methods, spin coating methods, dip coating methods, bar coating methods, and flow coating methods; and it is permissible to select one of them depending on configurations of the substrate. On this occasion, when the surfaces of the substrate is made so as not to be exposed to the composition according to the present invention for a long period of time, degradations of the substrate due to organic solvents can be inhibited.

It is advisable to appropriately set up a film thickness of coated films that are formed by means of coating depending on objectives. For example, the thicker the thickness of the resulting cured films is, the more the weatherability upgrades. However, making it too thick is not desirable, from the appearance of the resultant cured films and from the standpoint of productivity. Taking weatherability, appearance and productivity into consideration, it is desirable to set the film thickness of post-curing coated films within a range of from 5 to 50 µm, or furthermore from 10 to 40 µm.

It is advisable to appropriately select a temperature for drying the coated films depending on heat resistance of the substrate. When the substrate is made of resin, the temperature can be the resin's softening point or less. For example, in a case of polycarbonate resin, it is preferable to set the temperature within a range of from 50 to 120° C.

In a case where the composition according to the present invention is a light curing-type composition, it is advisable to dry the composition after it is applied onto the substrate, and then to irradiate it with light, such as ultraviolet rays. As for a preferable manufacturing method, it is possible to name a method in which the post-drying substrate is irradiated with light in such a state that it is maintained at high temperatures.

In a case where the composition according to the present invention is a light curing-type composition, as for the temperature when irradiating the composition with an ultraviolet ray, and the like, after drying it, although the temperature shall not be limited especially as far as it is a temperature or less at which the performance of substrate materials can be maintained, it can preferably fall within a range of from 50° C. to 200° C. For example, in the case of polycarbonate resin, it is preferable to set the temperature within a range of from 50 to 120° C., more preferably from 60 to 110° C., much more preferably, from 70 to 100° C., and especially preferably, from 80 to 100° C. By maintaining a temperature of the substrate within a range of from 50 to 120° C. when irradiating it with ultraviolet rays, it is possible to enhance the wear resistance of the resulting cured films.

As for some of the light, although ultraviolet rays and visible rays can be named, ultraviolet rays are preferable especially.

As for some of ultraviolet irradiation devices, high pressure-mercury lamps, metal halide lamps, electrodeless UV lamps, and LEDs can be named. In the case of electrodeless UV lamps, it is possible to suitably employ those of new types, too, that are operated by means of current resulting from direct-current power source.

An irradiation energy shall be set up appropriately depending on the types of active energy rays or the blending compositions. However, the following can be given as one of such examples in a case where a high-pressure mercury lamp is employed: the irradiation energy can preferably be from 100 to 10,000 mJ/cm$^2$, or more preferably, from 1,000 to 6,000 mJ/cm$^2$, by irradiation energy in UV-A region.

In a case where the composition according to the present invention is a thermo curing-type composition, it is advisable to dry the composition after it is applied onto the substrate, and then to heat it furthermore. As for a heating temperature, although it shall not be limited especially as far as it is a temperature or less at which the performance of substrate materials can be maintained, it can preferably be from 80 to 200° C.

As for a heating time, it can preferably be from 10 minutes or more to 120 minutes or less. When viewing it from the standpoint of productivity, it is advisable to set it at 60 minutes or less, or furthermore at 30 minutes or less.

Note that it is also allowable to carryout the curing of the composition in air, or it is even permissible to carry it out in a vacuum, or in an inert-gas environment. Although it is preferable to carry out the curing in a vacuum, or in an inert-gas atmosphere, in view of prospective performance of the resulting cured films, it is also advisable to carry it out in air, from the viewpoint of productivity.

In the present description, the temperatures for drying and heating are the superficial temperature of coated films, and are virtually equal to an atmospheric temperature in the drying or heating.

So far, explanations have been made on some of the embodiment modes of the curing-type coating-agent composition according to the present invention. However, the present invention is not one which is limited to the aforementioned embodiment modes. It is possible to execute the present invention in various modes, to which changes or modifications that one of ordinary skill in the art can carry out are made, within a range not departing from the gist.

EXAMPLES

Hereinafter, examples and comparative examples will be exhibited, thereby explaining the present invention in more detail. Note that the present invention shall not be limited at all by these examples.

In what follows, "parts" means parts by mass, and "%" means % by mass. Moreover, multi-functional urethane (meth)acrylates other than aforementioned Component (A), which do not correspond to Component (A), will be hereinafter referred to as Component (A)'. In addition, colloidal silicas (i.e., involatile components from which dispersion media were got rid of), which did not correspond to aforementioned Component (C-1) or (C-2), will be referred to as Component (C)'.

(1) Production Example No. 1

Production of Component (A) ("HDI3-HBA")

The following were charged in to a 3-L separable flask, which was equipped with a stirring device and an air-blowing tube: an isocyanate compound (e.g., "TPA-100," DURANATE produced by ASAHIKASEI CHEMICALS Co., Ltd., whose NCO content was 23%) whose major component was a nurate-type trimer of hexamethylene diisocyanate in an amount of 1,369.5 g (i.e., 7.5-mol NCO); 1.22-g 2,6-di-tert-butyl-4-methylphenol (hereinafter, being referred to as "BHT"); and 0.73-g dibutyl tin dilaurate (hereinafter, being referred to as "DBTL"). Then, 1,080-g (i.e., 7.5-mol) 4-hydroxybutyl acrylate (hereinafter, being referred to as "HBA") was dropped into them while stirring them at a liquid temperature of from 50 to 75° C.

After completing the dropping, they were further stirred at 80° C. for 4 hours, and their reactions were terminated after confirming the disappearance of isocyanate groups in the resulting reaction product by IR (or infrared absorption) analysis, thereby obtaining an isocyanuric ring-containing urethane (meth)acrylate compound. Hereinafter, this reaction product will be called "HDI3-HBA."

Note that "HDI3-HBA" corresponded to a compound in which all of $R^1$, $R^2$ and $R^3$ were a tetramethylene group, respectively, and all of $R^4$, $R^5$ and $R^6$ were a hydrogen atom, respectively, in said General Formula (1).

(2) Production Example No. 2

Production of Component (A)' ("IPDI-M305")

The following were charged into a 2-L separable flask, which was equipped with a stirring device and an air-blowing tube: 993-g pentaerythritol tri- and tetra-acrylates (containing tri-acrylate in an amount of 2 mol) (e.g., "M-305," ARONIX produced by TOAGOSEI Co., Ltd., hereinafter, being referred to as "M-305"); 0.61-g "BHT"; and 0.36-g "DBTL." Then, 222-g (i.e., 1.0-mol) isophorone diisocyanate (hereinafter, being referred to as "IPDI") was dropped into them while stirring them at a liquid temperature of from 70 to 75° C.

After completing the dropping, they were further stirred at 85° C. for 2 hours, and their reactions were terminated after confirming the disappearance of isocyanate groups in the resulting reaction product by IR (or infrared absorption) analysis, thereby obtaining a multi-functional urethane acrylate.

Hereinafter, this reaction product will be called "IPDI-M305."

(3) Production Example No. 3

Production of Component (c1)
("THPI-Alkoxysilane")

The following were charged into a 3-L separable flask, which was equipped with a stirrer: 1,119-g toluene; and 456-g (i.e., 3.0-mol) 3,4,5,6-tetrahydrophthalic anhydride. Then, 663-g (i.e., 3.0-mol) 3-aminopropyltriethoxysilane was dropped into them in the presence of nitrogen while stirring them at room temperature. After completing the dropping, they were increased in the temperature until ethanol was distilled away, and subsequently they were further reacted for 4 hours while keeping the reaction liquid within a range of from 85 to 110° C.

After completing their reactions, low-boiling-point components, such as toluene and ethanol, were distilled away by decompression while heating the flask in an 80° C. oil bath, thereby synthesizing an alkoxysilane compound (c1). Hereinafter, this reaction product will be called "THPI-Alkoxysilane."

It was ascertained by means of $^1$H-NMR spectrum that the thus obtained "THPI-Alkoxysilane" had a structure that was made of a compound according to said General Formula (3) wherein $R^{13}$ was an ethyl group, $R^{14}$ was a 1,3-propylene group (or trimethylene group), and "z" was 1.2.

The resulting "THPI-Alkoxysilane" was employed as a raw material (c1) in later-described Production Example No. 4.

(4) Production Example No. 4

Production of Component (C-1) ("THPI-Silica")

The following were charged into a 3-L separable flask, which was equipped with a stirrer: 960-g propylene glycol monomethylether (hereinafter, being referred to as "PGM"); 23.6-g water; and an isopropyl alcohol (hereinafter, being referred to as "IPA")-dispersion colloidal silica (e.g., "IPA-ST," a product of NISSAN CHEMICAL INDUSTRIES, Ltd., which exhibited an average particle diameter of from 10 to 15 nm (e.g., values being calculated from the specific surface areas according to the BET method), had solid contents in an amount of 30%, and contained "IPA" in an amount of 70%; hereinafter, being simply referred to as "IPA-ST") in an amount of 800 g. Then, after uniformizing them by stirring, 189-g "THPI-Alkoxysilane" was further charged into the flask, and was then dissolved in them by stirring at room temperature. On this occasion, a mass ratio between Component (c1) and Component (c2) was 44:56.

After heating this colloidal dispersion liquid at 80° C. in the presence of nitrogen to react it for 4 hours, it was condensed by distilling IPA, water, and the like, away until the resulting nonvolatile component accounted for 35%. Subsequently, 640-g "PGM" was further added to it, and then a small amount of water, and so forth, which remained in the reaction system, was further distilled away along with "PGM," and so on, thereby obtaining reaction products with 35% nonvolatile component. Hereinbelow, of the reaction products being obtained herein, the nonvolatile component (i.e., Component (C-1)), from which solvents etc. were got rid of, will be called "THPI-Silica."

(6) Production Example No. 5

Production of Component (C-2) ("Mac-TQ")

After charging 50-g 1-propanol for alcohol exchange reaction and 36.53-g (i.e., 0.24-mol) tetramethoxy silane (hereinafter, being referred to as "TMOS") into a reactor being equipped with a stirrer and a thermometer, 4.37-g methanol solution of 25%-by-mass tetramethylammonium hydroxide (i.e., 0.1-mol methanol, and 12-millimol tetramethylammonium hydroxide) was added to those above gradually while stirring them, and was reacted with them at a temperature of 25° C. under pH 9 for 6 hours. Thereafter, their internal temperature was set at 60° C., and then they were further reacted for another one hour while stirring them. Note herein that, when the reaction liquid was analyzed by gas chromatography with TCD detector, the following were detected: compounds, in which the methoxy groups of the "TMOS" were replaced by a n-propoxy group, respectively (from monosubstituted product to tetrasubstituted product); and the unreacted "TMOS." Moreover, the "TMOS" was detected only in a trace amount. Of these, a proportion of compounds containing a n-propoxy group was virtually 100% in total. Based on a peak area of the products in gas chromatography, a substitution number of 1-propanol (i.e., an averaged number of n-propoxy groups per one molecule of the n-propoxy group-containing compounds) was found to be 2.7.

Next, 59.62-g (i.e., 0.24-mol) 3-methacryloxypropyl trimethoxysilane was added to the aforementioned reaction liquid, and 30.2-g water was further added to it. And, 7.88-g methanol solution of 25% tetramethylammonium hydroxide (i.e., 0.18-mol methanol, and 21.6-millimol tetramethylammonium hydroxide) was further added to the reaction liquid, and was reacted with it at a temperature of 25° C. under pH 9 for 24 hours while stirring it. Thereafter, 22.2-g (i.e., 35.3-millimol) aqueous solution of 10%-by-mass nitric acid was added to neutralize the reaction liquid. Subsequently, the resulting neutralized liquid was added into a mixed liquid of 120-g diisopropyl ether and 180-g water in order to carry out extraction. Salts and excessive acid were removed by washing the resultant diisopropyl ether layer with water. Thereafter, an aluminum salt of N-nitroso phenylhydroxylamine (e.g., "Q-1301 (trade name)" produced by WAKO JUNYAKU KOGYO, Co., Ltd.), which served as a polymerization inhibitor, was added to the diisopropyl ether layer in an amount of 11.5 mg. The organic solvents were distilled away from the thus obtained diisopropyl ether solution under decompression, thereby obtaining an organosilicon compound as a colorless transparent solid. Its yield was 57.72 g.

The organosilicon compound was analyzed by $^1$H-NMR, and it was then ascertained that the thus obtained organosilicon compound was a copolycondensate that was obtained by reacting 3-methacryloxypropyl trimethoxysilane and tetrapropoxy silane stoichiometrically.

A content proportion of alkoxy group (i.e., n-propoxy group being bonded to silicon atom), which was calculated from a $^1$H-NMR chart of the organosilicon compound, was such an amount that was equivalent to 2.5% with respect to the entirety of alkoxy groups that were included in the charged raw materials. Moreover, the $M_n$ was 9,600. Hereinafter, this reaction product will be called "Mac-TQ."

Example No. 1 through Example No. 9 and
Comparative Example No. 1 through Comparative
Example No. 12

An ordinary method was followed to stir and then mix components shown in Table 1, Table 4 and Table 6, thereby producing light curing-type coating-agent compositions. Compositions according to the respective examples (i.e., #E1 through E9) are given in Table 1, and compositions according to the respective comparative examples (i.e., #C1 through C12) are given in Table 4 and Table 6.

Note that numeric values of the respective components in Table 1, Table 4 and Table 6 are expressed as the numbers of parts by mass. Moreover, abbreviations in the tables express the following compounds.

Abbreviations
(i) Component (A)
"HDI3-HBA": Reaction Product according to Production Example No. 1
(ii) Component (A)'
"IPDI-M305": Reaction Product according to Production Example No. 2
(iii) Component (B)
"M-315": "M-315," ARONIX produced by TOAGOSEI Co., Ltd., i.e., tris(acryloyloxyethyl)isocyanurate, corresponding to a compound wherein: $R^7$, $R^8$ and $R^9$ is an ethylene group, respectively; $R^{10}$, R and $R^{12}$ is a hydrogen atom, respectively; $n^1$, $n^2$ and $n^3$ is 1, respectively; and $n^1+n^2+n^3=3$ in said General Formula (2);
(iv) Component (C-1)
"THPI-Silica": Reaction Product (or Nonvolatile Component) according to Production Example No. 4;
(v) Component (C-2)
"Mac-TQ": Reaction Product according to Production Example No. 5;
(vi) Component (C)'
"Acryl-Silica": Nonvolatile Component in methyl ethyl ketone (hereinafter, being referred to as "MEK")-dispersion Acryl-modified Colloidal Silica, a product of NISSAN CHEMICAL INDUSTRIES, Ltd., under Trade Name of "MEK-AC-2101" exhibiting an average particle diameter of from 10 to 15 nm (e.g., values being calculated from the specific surface areas according to the BET method), having solid contents in an amount of 33%, and containing "MEK" in an amount of 67%;
(vii) Component (D)
"Irg-819": Photo Radical-polymerization initiator produced by BASF Co., Ltd., under Trade Name of "IRGACURE 819," namely, bis(2,4,6-trimethylbenzoyl)-phenylphosphine oxide;
(viii) Component (E)
"RUVA-93": Benzotriazole-based Ultraviolet Absorber having a methacryloyl group, a product of OTSUKA KAGAKU Co., Ltd., under Trade Name of "RUVA-93," namely, 2-[2-hydroxy-5-(2-methacryloyloxyethyl)phenyl]-2H-benzo triazole;

(iv) Component (F)

"PGM": Propylene Glycol Monomethylether; and

"MEK": methyl ethyl ketone (or "MEK" in "MEK-AC-2101" according to said Component (C)');

(x) Component (G)

"T-123": Hindered Amine-based Light Stabilizer, a product of BASF Co., Ltd., under Trade Name of "TINUVIN 123," namely, decanedioic acid bis(2,2,6,6-tetramethyl-1-(octyloxy)-4-piperidinyl) ester; and (xi) Component (H)

"8019add": Silicone-based Surface Modifier (or leveling agent), a product of DOW CORNING TORAY Co., Ltd., under Trade Name of "8019 ADDITIVE," with 100% Effective Ingredient Note that the colloidal silica's average particle diameter is an average primary particle diameter, and the phrase, "from 10 to 15 nm," is a catalogue value for which the dispersions or variations between the product's lots are taken into account.

Structures of effective ingredients in Component (E) and Component (G) are illustrated below.

(Chemical Formula 10)

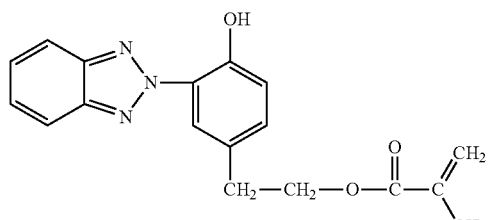

(RUVA-93)

(Chemical Formula 11)

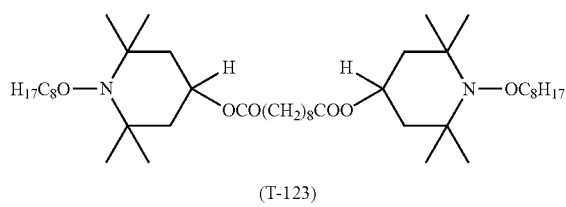

(T-123)

Compositions shown in Table 1, Table 4 and Table 6 were applied onto a surface of a 10-cm square polycarbonate resin plate, respectively, using a bar coater so that a post-drying paint-film thickness became about 15 µm. After drying the resulting paint films at 100° for 10 minutes using a hot-air dryer, an ultraviolet irradiation operation was immediately carried out onto the paint films whose paint-film superficial temperature was 90° C., thereby making samples each of which was equipped with a cured film on one of the opposite surfaces of the resin plate.

For the ultraviolet irradiation operation, a high-pressure mercury lamp produced by EYE GRAPHICS Co., Ltd. was employed. The lamp output, lamp height and conveyor speed were adjusted so as to make the peak illumination intensity 400 mW/cm$^2$, and so as to make the irradiation energy per one pass 250 mJ/cm$^2$ in the region of UV-A according to UV POWER PUCK produced by EIT Corp., and the lamp was then put into operation to irradiate the cured films with ultraviolet rays for 12 passes (i.e., 3,000 mJ/cm$^2$ in total).

For the obtained cured films, the transparency, (initial) adhesiveness, wear resistance, weatherability (e.g., weathered adhesiveness and presence or absence of cracks), and scratch resistance were evaluated by methods being described below. Those evaluation results are given in Table 2, Table 3, Table 5, Table 7 and Table 8.

(I) Initial Adhesiveness

The cured films were provided with 11 slits by cutting at intervals of 2 mm onto each of the longitudinal and lateral sides using a cutter knife, thereby forming 100 grid-shaped square elements, respectively. Thereafter, pursuant to JIS K5400, a cellophane tape produced by NICHIBAN Co., Ltd. was stuck onto the grid-shaped square elements, and then the cellophane tape was peeled off, respectively. The adhesiveness was evaluated by a proportion of residual films after peeling off the cellophane tape (that is, a number of remained grid-shaped square elements (units: %)).

(II) Transparency

Pursuant to JIS K7136, the haze H (%) of the cured films was measured for every substrate using "NDH-2000," a turbidimeter produced by NIHON DENSHOKU KOGYO. The smaller the H value was, the more satisfactorily the transparency was evaluated.

(III) Wear Resistance

A Taber-type wear test was carried out in compliance with ASTM D-1044. The wear resistance was evaluated by measuring the haze difference ΔH (%) between the values before and after the Taber-type wear test in which a Taber-type wear tester was employed. Note herein that the wear wheel was CS-10F, each of the loads was set at 500 g, and the number of rotations was set at 500 times. The smaller the ΔH (%) was, the more satisfactorily the wear resistance was evaluated.

(IV) Weatherability

Pursuant to JIS K5400, an accelerated test was carried out for 5,000 hours using a carbon arc-type sunshine weatherometer, thereby evaluating the adhesiveness (or weathered adhesiveness) and the presence or absence of cracks for every 500 hours. Note that the adhesiveness was judged to be satisfactory in the samples from which the cured film was not peeled off when a cellophane tape was stuck onto and then peeled off from the post-accelerated-test cured film. Moreover, regarding the cracks, those in which no cracks were discovered by visual observation were judged to be satisfactory. The results are shown in Table 2, Table 3, Table 5 and Table 7. In the respective tables, there are set forth the numbers of the longest time of the testing times in the accelerated test being carried out for cured films that were ascertained to be satisfactory with regard to the adhesiveness and cracks. Those with a greater number of hours were evaluated to be more satisfactory in terms of the weatherability. Regarding those which received a satisfactory evaluation after the accelerated test for 5,000 hours, they are noted by a symbol, "5000<," respectively.

(V) Scratch Resistance

For Samples #02, #04, #23 and #28, the scratch resistance was evaluated. Luster values (e.g., at 20°) were measured for the respective cured films to find the difference before and after a scratch test, thereby evaluating the scratch resistance by a luster retention rate.

The scratch test was carried out by scratching the cured film with a load of 500 g for 150 times back and forth reciprocally using a water-moistened Nylon scrubbing brush with abrasive (e.g., "SCOTCH BRIGHT No. 96" produced by SUMITOMO 3M Co., Ltd.). The cured films before and after the scratch test were subjected to a measurement for the luster retention rate using a "GAKUSHIN"-type rubbing tester, a product of DAIEI KAGAKU SEIKI Co., Ltd., for the fastness of dyed article. Results of the measurement are shown in Table 8. The results show that the higher luster retention rate they have the more satisfactory the scratch resistance was.

As shown in Table 2 and Table 3, the samples being made by using the curing-type coating-agent compositions according to the present invention were excellent in terms of the transparency, adhesiveness, wear resistance and weatherability. Of these, Example No. 1 and Example No. 5 exhibited such satisfactory weathered adhesiveness as 5,000 hours. Moreover, Example No. 2 or Example No. 6, in which the amount of Component (B) in Example No. 1 or Example No. 5 was increased from 15 parts to 30 parts and the amount of Component (A) was reduced by that extent, exhibited such weathered adhesiveness that was upgraded up to exceeding 5,000 hours, and exhibited more upgraded wear resistance as well. Example No. 3 and Example No. 7, in which the amount of Component (B) was further increased up to 50 parts, exhibited more upgraded wear resistance, and was excellent exceptionally in terms of the weatherability in the same manner as Example No. 2 or Example No. 6.

When the amount of the UV absorber serving as Component (E) was increased in order to maintain the weathered adhesiveness in a case where the coated thickness became thinner, the resulting wear resistance declined. However, as indicated in Example No. 4, the wear resistance was satisfactory and the weatherability was satisfactory exceptionally when the amounts of Component (E) and Component (C-1) were set at 7.5 parts and 15 parts, respectively. Note herein that the weathered adhesiveness declined slightly in those in which the acryl-modified colloidal silica serving as Component (C)' was used combinedly along with Component (C-1). Moreover, when the amount of Component (E) was increased as did in Example No. 8, although the wear resistance had declined slightly, it was at a satisfactory level. When the amount of Component (C-2) was increased up to 25 parts as did in Example No. 9, the weathered adhesiveness had declined a bit, however, the wear resistance upgraded greatly.

On the contrary, Comparative Example No. 1 and Comparative Example No. 9, which did not include any Component (A) but in which Component (B) was present excessively, exhibited poorer weathered adhesiveness, as shown in Table 5 and Table 7. Moreover, Comparative Example No. 2 and Comparative Example No. 10, which did not include any Component (B), exhibited faulty initial adhesiveness. Comparative Example No. 3, which did not include any Component (C-1) and Component (C-2), exhibited faulty wear resistance. Comparative Example No. 4 and Comparative Example No. 11, which did not include any Component (E), exhibited worse weatherability. In Comparative Example No. 5 in which Component (C-1) was blended excessively, the wear resistance had worsened adversely, and furthermore the weatherability had also worsened. In Comparative Example No. 12 in which Component (C-2) was blended excessively, the wear resistance was satisfactory, however, the weatherability had worsened greatly. As described above, it was important to blend Component (A), Component (B), Component (C-1), Component (C-2) and Component (E) in an appropriate amount, respectively.

Although Comparative Example No. 6 in Table 5 was an example employing a multi-functional urethane acrylate (i.e., Component (A)') whose wear resistance was satisfactory even when it did not include any inorganic fine particles, the weatherability was faulty. Although Comparative Example No. 7 was another example employing this Component (A)', instead of Component (C-1) or Component (C-2), as a wear-resistance improving agent, not only the wear resistance but also the weatherability were faulty.

Comparative Example No. 8 in Table 5 was a still another example in which Component (C)' (or "Acryl-Silica") substituted for Component (C-1) (or "THPI-Silica") in Example No. 4, or for Component (C-2) (or "Mac-TQ") in Example No. 8, and corresponds to the composition that is set forth in above-described Patent Literature No. 4. In Comparative Example No. 8, the wear resistance was satisfactory, however, the weathered adhesiveness was poorer.

Table 8 shows results of another scratch resistance test by means of testing method that differed from the Taber wear test. As shown in Table 8, the luster retention rate of Comparative Example No. 3, which neither included Component (C-1) nor Component (C)', was bad exceptionally. On the contrary, Example No. 2, Example No. 4 and Comparative Example No. 8, in which the superficially-modified colloidal silica was employed, produced a favorable result, respectively.

INDUSTRIAL APPLICABILITY

It is possible to employ the curing-type coating-agent composition according to the present invention suitably as coating agents for various substrates being employed outside, in particular, for substrates being made of resins.

To be concrete, the following can be given: architectural materials for outside applications, such as exterior walls and roofs of buildings; cases for outdoor devices and meters being always installed outside; road-related members, such as plastic component parts being used for traffic lights, outside lightings, traffic signs and guard rails; show windows; lenses, such as telescopes and eyeglasses; playground equipment or toys being present in parks or amusement grounds; and articles for food, or articles for medical service, which are irradiated with light for the purpose of sterilization or the like.

TABLE 1

| | | Composition No. | | | | | | | | |
|---|---|---|---|---|---|---|---|---|---|---|
| | | #E1 | #E2 | #E3 | #E4 | #E5 | #E6 | #E7 | #E8 | #E9 |
| (A) | HDI3-HBA | 75 | 60 | 40 | 35 | 70 | 55 | 35 | 35 | 45 |
| (B) | M-315 | 15 | 30 | 50 | 50 | 15 | 30 | 50 | 50 | 50 |
| (C-1) | THPI-Silica | 10 | 10 | 10 | 15 | | | | | |
| (C-2) | Mac-TQ | | | | | 15 | 15 | 15 | 15 | 25 |
| (D) | Irg-819 | 2 | 2 | 2 | 2 | 2 | 2 | 2 | 2 | 2 |
| (E) | RUVA-93 | 5 | 5 | 5 | 7.5 | 5 | 5 | 5 | 7.5 | 7.5 |
| (F) | PGM | 110 | 110 | 110 | 110 | 110 | 110 | 110 | 110 | 110 |

TABLE 1-continued

| | | Composition No. | | | | | | | | |
|---|---|---|---|---|---|---|---|---|---|---|
| | | #E1 | #E2 | #E3 | #E4 | #E5 | #E6 | #E7 | #E8 | #E9 |
| (G) | T-123 | 0.5 | 0.5 | 0.5 | 0.5 | 0.5 | 0.5 | 0.5 | 0.5 | 0.5 |
| (H) | 8019add | 0.1 | 0.1 | 0.1 | 0.1 | 0.1 | 0.1 | 0.1 | 0.1 | 0.1 |

TABLE 2

| | | Sample No. | | | |
|---|---|---|---|---|---|
| | | #01 | #02 | #03 | #04 |
| | | Composition No. | | | |
| | | #E1 | #E2 | #E3 | #E4 |
| Initial State | Transparency, H (%) | 0.3 | 0.3 | 0.3 | 0.3 |
| | Adhesiveness, Residual Film (%) | 100 | 100 | 100 | 100 |
| Wear Resistance, ΔH (%) | | 7.4 | 5.7 | 4.7 | 6.1 |
| Weather-Ability | Adhesiveness (hour) | 5000 | 5000< | 5000< | 5000< |
| | Cracks (hour) | 5000< | 5000< | 5000< | 5000< |

TABLE 3

| | | Sample No. | | | | |
|---|---|---|---|---|---|---|
| | | #05 | #06 | #07 | #08 | #09 |
| | | Composition No. | | | | |
| | | #E5 | #E6 | #E7 | #E8 | #E9 |
| Initial State | Transparency, H (%) | 0.3 | 0.3 | 0.3 | 0.3 | 0.3 |
| | Adhesiveness, Residual Film (%) | 100 | 100 | 100 | 100 | 100 |
| Wear Resistance, ΔH (%) | | 9.7 | 8.9 | 7.9 | 9.5 | 6.8 |
| Weather-ability | Adhesiveness (hour) | 5000 | 5000< | 5000< | 5000< | 4500 |
| | Cracks (hour) | 5000< | 5000< | 5000< | 5000< | 5000< |

TABLE 4

| | | Composition No. | | | | | | | |
|---|---|---|---|---|---|---|---|---|---|
| | | #C1 | #C2 | #C3 | #C4 | #C5 | #C6 | #C7 | #C8 |
| (A) | HDI3-HBA | | 90 | 70 | 60 | 30 | | 20 | 35 |
| (A)' | IPDI-M305 | | | | | | 100 | 50 | |
| (B) | M-315 | 90 | | 30 | 30 | 30 | | 30 | 50 |
| (C-1) | THPI-Silica | 10 | 10 | | 10 | 40 | | | |
| (C-2) | Mac-TQ | | | | | | | | |
| (C)' | Acryl-Silica | | | | | | | | 15 |
| (D) | Irg-819 | 2 | 2 | 2 | 2 | 2 | 2 | 2 | 2 |
| (E) | RUVA-93 | 5 | 5 | 5 | | 5 | 5 | 5 | 7.5 |
| (F) | PGM | 110 | 110 | 110 | 110 | 110 | 110 | 110 | 80 |
| | MEK | | | | | | | | 30 |
| (G) | T-123 | 0.5 | 0.5 | 0.5 | 0.5 | 0.5 | 0.5 | 0.5 | 0.5 |
| (H) | 8019add | 0.1 | 0.1 | 0.1 | 0.1 | 0.1 | 0.1 | 0.1 | 0.1 |

TABLE 5

| | | Sample No. | | | | | | | |
|---|---|---|---|---|---|---|---|---|---|
| | | #21 | #22 | #23 | #24 | #25 | #26 | #27 | #28 |
| | | Composition No. | | | | | | | |
| | | #C1 | #C2 | #C3 | #C4 | #C5 | #C6 | #C7 | #C8 |
| Initial State | Transparency, H (%) | 0.3 | 0.3 | 0.3 | 0.3 | 0.3 | 0.3 | 0.3 | 0.3 |
| | Adhesiveness, Residual Film (%) | 100 | 0 | 100 | 100 | 100 | 100 | 100 | 100 |
| Wear Resistance, ΔH (%) | | 5.7 | 8.7 | 15.5 | 4.2 | 9.8 | 7.3 | 13.3 | 6.8 |
| Weather-ability | Adhesiveness (hour) | 2500 | — | 5000< | 1000 | 3000 | 2000 | 3000 | 4000 |
| | Cracks (hour) | 5000< | — | 5000< | 3000 | 4000 | 2500 | 3500 | 5000< |

*Note that no weatherability test was conducted for #22 because it exhibited worse initial adhesiveness.

TABLE 6

| | | Composition No. | | | |
|---|---|---|---|---|---|
| | | #C9 | #C10 | #C11 | #C12 |
| (A) | HDI3-HBA | | 85 | 55 | 30 |
| (A)' | IPDI-M305 | | | | |
| (B) | M-315 | 85 | | 30 | 30 |
| (C-1) | THPI-Silica | | | | |
| (C-2) | Mac-TQ | 15 | 15 | 15 | 40 |
| (C)' | Acryl-Silica | | | | |
| (D) | Irg-819 | 2 | 2 | 2 | 2 |
| (E) | RUVA-93 | 5 | 5 | | 5 |
| (F) | PGM | 110 | 110 | 110 | 110 |
| | MEK | | | | |
| (G) | T-123 | 0.5 | 0.5 | 0.5 | 0.5 |
| (H) | 8019add | 0.1 | 0.1 | 0.1 | 0.1 |

TABLE 7

| | | Sample No. | | | |
|---|---|---|---|---|---|
| | | #29 | #30 | #31 | #32 |
| | | Composition No. | | | |
| | | #C9 | #C10 | #C11 | #C12 |
| Initial State | Transparency, H (%) | 0.3 | 0.3 | 0.3 | 0.3 |
| | Adhesiveness, Residual Film (%) | 100 | 0 | 100 | 100 |
| Wear Resistance, ΔH (%) | | 8.5 | 11.1 | 7.1 | 6.2 |
| Weatherability | Adhesiveness (hour) | 2500 | — | 1000 | 2500 |
| | Cracks (hour) | 5000< | — | 3000 | 3000 |

TABLE 8

| Sample No. | Composition No. | Luster Retention Rate (%) |
|---|---|---|
| #02 | #E2 (i.e., Ex. No. 2) | 80 |
| #04 | #E4 (i.e., Ex. No. 4) | 80 |
| #23 | #C3 (i.e., Comp. Ex. No. 3) | 5 |
| #28 | #C8 (i.e., Comp. Ex. No. 8) | 85 |

The invention claimed is:

1. A curable coating-agent composition being characterized in that:

the curable coating-agent composition contains:

Component (A) in an amount of from 20 to 80 parts by mass;

Component (B) in an amount of from 10 to 70 parts by mass;

Component (C-1) in an amount of from 1 to 35 parts by mass;

a radical-polymerization initiator serving as Component (D) in an amount of from 0.1 to 10 parts by mass;

an ultraviolet absorber serving as Component (E) in an amount of from 1 to 12 parts by mass; and an organic solvent serving as Component (F) in an amount of from 10 to 1,000 parts by mass;

with respect to a sum of the Component (A), the Component (B) and the Component (C-1) being taken as 100 parts by mass:

wherein Component (A) is an isocyanuric ring-containing urethane (meth)acrylate compound being expressed by following Formula (1):

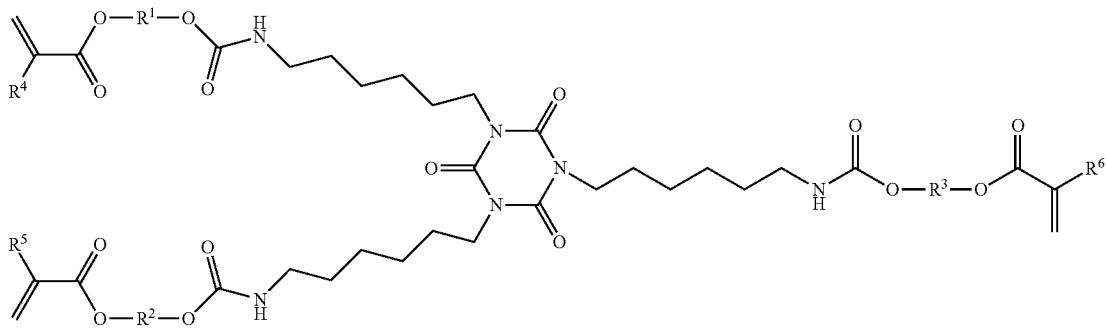

(1)

in Formula (1), each of $R^1$, $R^2$ and $R^3$ is a divalent organic group whose number of carbon atoms is from 2 to 10 independently; and each of $R^4$, $R^5$ and $R^6$ is a hydrogen atom, or a methyl group independently;

wherein Component (B) is an isocyanuric ring-containing tri(meth)acrylate compound being free from any urethane bond that is expressed by following Formula (2):

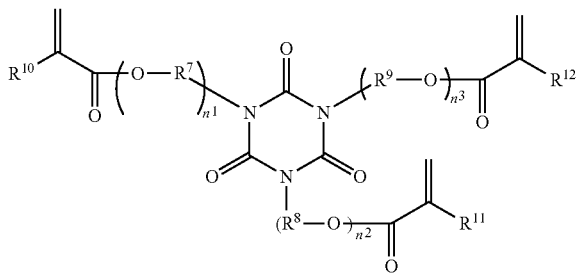
(2)

in Formula (2), each of $R^7$, $R^8$ and $R^9$ is a divalent organic group whose number of carbon atoms is from 2 to 10 independently; each of $R^{10}$, $R^{11}$ and $R^{12}$ is a hydrogen atom, or a methyl group independently; each of $n^1$, $n^2$ and $n^3$ is a number of from 1 to 3 independently; and $n^1+n^2+n^3=$ from 3 to 9:

wherein Component (C-1) is an involatile component formed by reacting an alkoxysilane compound (c1) according to Formula (3), with a colloidal silica (c2), wherein a mass ratio of (c1) to (c2) is 9:1 to 1:9;

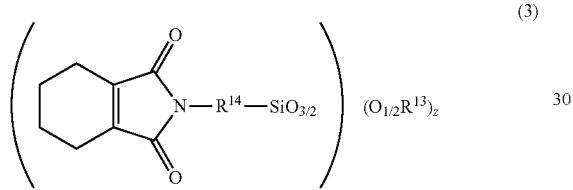
(3)

in Formula (3), $R^{13}$ is a hydrogen atom, or a monovalent organic group; $R^{14}$ is a divalent hydrocarbon whose number of carbon atoms is from 1 to 6; and "z" is a positive number of from 0.1 or more to 3 or less; wherein when "z" is less than 3, the alkoxysilane compound (c1) is a condensate, and $R^{13}$ may be two or more different groups.

2. The curable coating-agent composition as set forth in claim 1, wherein said Compound (E) includes a benzotriazole-based ultraviolet absorber having a (meth)acryloyl group.

3. The curable coating-agent composition as set forth in claim 1, wherein said colloidal silica (c2) has an average primary particle diameter of from 1 to 100 nm.

4. The curable coating-agent composition as set forth in claim 1, wherein $R^1$, $R^2$ and $R^3$ are a tetramethylene group, respectively; and $R^4$, $R^5$ and $R^6$ are a hydrogen atom, respectively in Formula (1) for said Component (A).

5. The curable coating-agent composition as set forth in claim 1, wherein $R^7$, $R^8$ and $R^9$ are an ethylene group, respectively; $R^{10}$, $R^{11}$ and $R^{12}$ are a hydrogen atom, respectively; $n^1$, $n^2$ and $n^3$ are 1, respectively; and $n^1+n^2+n^3=3$ in Formula (2) for said Component (B).

6. The curable coating-agent composition as set forth in claim 1 further containing a hindered amine-based light stabilizer serving as Component (G) in an amount of from 0.05 to 1.5 parts by mass with respect to a sum of said Component (A), said Component (B) and said Component (C-1) being taken as 100 parts by mass.

7. The curable coating-agent composition as set forth in claim 1 further containing a silicone-based and/or fluorine-based surface modifier serving as Component (H) in an amount of from 0.01 to 1.0 part by mass with respect to a sum of said Component (A), said Component (B) and said Component (C-1) being taken as 100 parts by mass.

8. The curable coating-agent composition as set forth in claim 1, wherein said Component (D) is a photo radical-polymerization initiator.

9. The curable coating-agent composition as set forth in claim 1, wherein said Component (C-1) is an involatile component in reaction products obtained by means of a production process that includes:

a step of adding an aminopropyltrialkoxysilane to a carboxylic acid anhydride having a double bond that is expressed by following Formula (6), thereby turning them into an amic acid;

a step of turning said amic acid into a maleimide group by means of subjecting said amic acid to ring closing by heating, and subjecting an alkoxyl group to a hydrolytic condensation reaction with use of water that generates in the ring-closing reaction, thereby obtaining an alkoxysilane compound (c1) being expressed by said Formula (3); and a step of reacting the obtained (c1) with the colloidal silica (c2) whose average primary particle diameter is from 1 to 100 nm by heating them in the presence of an organic solvent including water:

(6)

* * * * *